United States Patent
Yamada

(10) Patent No.: US 10,522,066 B2
(45) Date of Patent: Dec. 31, 2019

(54) IMAGE DISPLAY APPARATUS, IMAGE DISPLAY METHOD, AND NON-TRANSITORY COMPUTER READABLE MEDIUM STORING PROGRAM

(71) Applicant: JVC KENWOOD Corporation, Yokohama-shi, Kanagawa (JP)

(72) Inventor: Yasuyuki Yamada, Yokohama (JP)

(73) Assignee: JVCKENWOOD Corporation, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/949,428

(22) Filed: Apr. 10, 2018

(65) Prior Publication Data

US 2018/0226007 A1 Aug. 9, 2018

Related U.S. Application Data

(63) Continuation of application No. PCT/JP2016/003594, filed on Aug. 4, 2016.

(30) Foreign Application Priority Data

Dec. 17, 2015 (JP) ................. 2015-245823

(51) Int. Cl.
*G09G 3/02* (2006.01)
*G02B 26/10* (2006.01)
(Continued)

(52) U.S. Cl.
CPC ............ *G09G 3/025* (2013.01); *G02B 26/10* (2013.01); *H04N 9/3135* (2013.01); *H04N 9/3182* (2013.01); *H04N 9/3194* (2013.01); *G02B 26/101* (2013.01); *G02B 26/105* (2013.01); *G02B 27/01* (2013.01); *G09G 2310/04* (2013.01); *G09G 2320/0233* (2013.01);
(Continued)

(58) Field of Classification Search
None
See application file for complete search history.

(56) References Cited

U.S. PATENT DOCUMENTS

2007/0195294 A1\* 8/2007 Willey .................. G03B 21/26
353/119
2008/0049101 A1 2/2008 Yamazaki
(Continued)

FOREIGN PATENT DOCUMENTS

JP 2009-037176 A 2/2009
JP 2010-169772 A 8/2010
(Continued)

*Primary Examiner* — Joseph R Haley
(74) *Attorney, Agent, or Firm* — Procopio, Cory, Hargreaves & Savitch LLP

(57) ABSTRACT

In a case in which a predetermined condition is satisfied, the scan control unit sets a vertical scan speed held when a first region in which a content is present in the display image data is scanned in a vertical direction to a first speed that is lower than a constant speed that is set when a frame scan time required to display one frame is a constant time with the vertical scan speed held constant. The scan control unit sets a vertical scan speed held when a second region in which no content is present in the display image data is scanned in a vertical direction to a second speed that is higher than the constant speed so that the frame scan time is the constant time.

9 Claims, 25 Drawing Sheets

(51) Int. Cl.
*H04N 9/31* (2006.01)
*G02B 27/01* (2006.01)

(52) U.S. Cl.
CPC ........... *G09G 2320/0633* (2013.01); *G09G 2340/0435* (2013.01); *G09G 2360/144* (2013.01); *G09G 2380/10* (2013.01)

(56) References Cited

U.S. PATENT DOCUMENTS

| | | |
|---|---|---|
| 2010/0182668 A1 | 7/2010 | Abe et al. |
| 2012/0313909 A1 | 12/2012 | Ishida et al. |
| 2015/0168733 A1* | 6/2015 | Rumreich ............ G02B 26/101 348/744 |
| 2017/0144596 A1* | 5/2017 | Wu ........................ B60Q 1/323 |

FOREIGN PATENT DOCUMENTS

| | | |
|---|---|---|
| JP | 2011-166396 A | 8/2011 |
| JP | 2012-255858 A | 12/2012 |
| JP | 2014-058204 A | 4/2014 |
| JP | 2014-197052 A | 10/2014 |
| JP | 2015-517120 A | 6/2015 |
| JP | 2015-225244 A | 12/2015 |

* cited by examiner

IMAGE DISPLAY APPARATUS, IMAGE DISPLAY METHOD, AND NON-TRANSITORY COMPUTER READABLE MEDIUM STORING PROGRAM

CROSS REFERENCE TO RELATED APPLICATION

This application claims priority based on Japanese Patent Application No. 2015-245823, filed on Dec. 17, 2015 and International Application No. PCT/JP2016/003594, filed on Aug. 4, 2016, the entire disclosure of which are incorporated herein.

BACKGROUND

The present invention relates to image display apparatuses, image display methods, and programs.

An image display apparatus of a laser scan type is known in which laser light is reflected by a scan mirror and thus scanned to project an image onto a screen. In this case, the luminance of the image projected onto the screen is desired to be raised depending on the conditions surrounding the image display apparatus—for example, when the surroundings of the image display apparatus are bright. In such a case, the luminance of the overall image can be raised by raising the intensity of the laser light. However, raising the intensity of the laser light may be difficult due to design, cost considerations, and so on.

In relation to this technique, Japanese Unexamined Patent Application Publication No. 2011-166396 discloses a technique for raising the luminance by lowering the scan speed. Specifically, when the intensity of laser light is constant, the laser light remains in a given region for a longer period of time when the scan speed is low than that when the scan speed is high. Thus the portion in which the scan speed of the laser light is low has a higher luminance than that in which the scan speed of the laser light is high.

SUMMARY

If the scan speed is simply lowered by using the technique disclosed in Japanese Unexamined Patent Application Publication No. 2011-166396, the frame scan time per frame, namely, the frame rate may vary. On the other hand, trying to keep the frame scan time constant may lead to varied frame sizes, such as varied aspect ratios.

An image display apparatus according to the exemplary embodiment includes: a laser light source unit configured to output laser light; a scan mirror unit configured to reflect and scan the laser light; a laser light control unit configured to control the laser light source unit so that a display image corresponding to input display image data is displayed; and a scan control unit configured to control the scan mirror unit so that the display image corresponding to the display image data is displayed, in which, in a case in which a predetermined condition is satisfied, the scan control unit sets a vertical scan speed held when a first region in which a content is present in the display image data is scanned in a vertical direction to a first speed that is lower than a constant speed that is set when a frame scan time required to display one frame is a constant time with the vertical scan speed held constant, and sets a vertical scan speed held when a second region in which no content is present in the display image data is scanned in a vertical direction to a second speed that is higher than the constant speed so that the frame scan time is the constant time.

An image display method according to the exemplary embodiment includes: acquiring display image data; and in a case in which a predetermined condition is satisfied, performing control so that a display image corresponding to the display image data is displayed with a vertical scan speed held when a first region in which a content is present in the display image data is scanned in a vertical direction being set to a first speed that is lower than a constant speed that is set when a frame scan time required to display one frame is a constant time with the vertical scan speed held constant and with a vertical scan speed held when a second region in which no content is present in the display image data is scanned in a vertical direction being set to a second speed that is higher than the constant speed so that the frame scan time is the constant time.

A program according to the exemplary embodiment causes a computer to execute a step of acquiring display image data; and a step of performing control, in a case in which a predetermined condition is satisfied, so that a display image corresponding to the display image data is displayed with a vertical scan speed held when a first region in which a content is present in the display image data is scanned in a vertical direction being set to a first speed that is lower than a constant speed that is set when a frame scan time required to display one frame is a constant time with the vertical scan speed held constant and with a vertical scan speed held when a second region in which no content is present in the display image data is scanned in a vertical direction being set to a second speed that is higher than the constant speed so that the frame scan time is the constant time.

DETAILED DESCRIPTION

First Exemplary Embodiment

Figure 1:
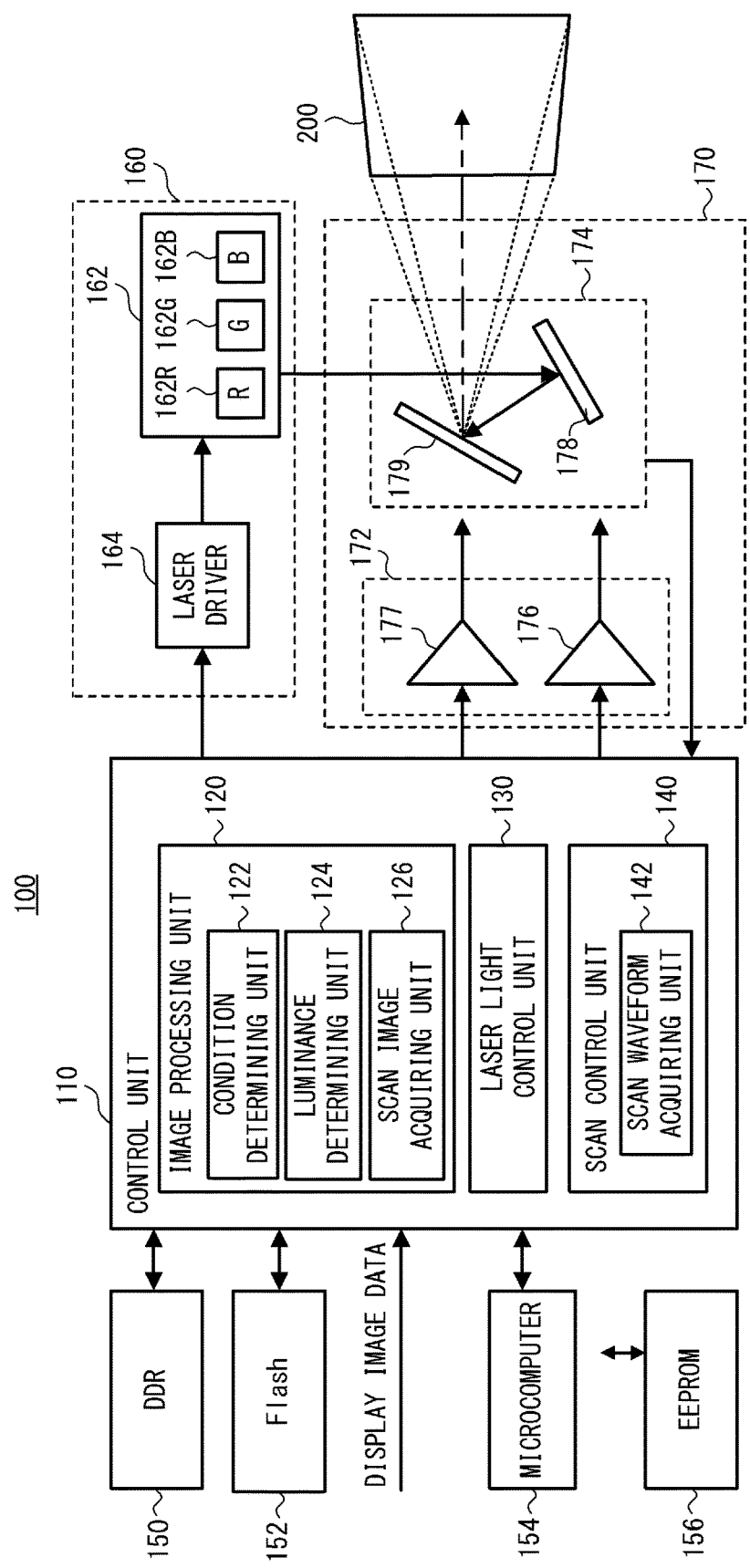
FIG. 1 is a block diagram illustrating a configuration of an image display apparatus according to a first exemplary embodiment.

Hereinafter, exemplary embodiments of the present invention will be described with reference to the drawings. It is to be noted that the constituent elements that are substantially identical are given identical reference characters.

FIG. 1 is a block diagram illustrating a configuration of an image display apparatus 100 according to a first exemplary embodiment. The image display apparatus 100 according to the first exemplary embodiment can be applied to a projector, a head-up display (HUD), a head-mounted display (HMD), or the like. For example, in a case in which the image display apparatus 100 is a head-up display, the image display apparatus 100 is mounted in a vehicle and presents various pieces of information to the driver or the like serving as a user in the form of virtual images. The exemplary embodiments described hereinafter illustrate examples in which the image display apparatus 100 is a head-up display mounted in a vehicle.

Images presented by the image display apparatus 100, or the head-up display, in the form of virtual images include, for example, an image for route guidance, an image for warning, an image based on content playback, and an image related to various user interfaces (UIs). These images may be still images or moving images.

The image display apparatus 100 includes a control unit 110, a double data rate (DDR) memory 150, a flash memory 152, a microcomputer 154, an electrically erasable and programmable read-only memory (EEPROM) 156, a laser light source unit 160, and a scanner unit 170. The laser light source unit 160 includes a laser diode 162 and a laser driver 164. The scanner unit 170 includes a scanner driver 172 and a scan mirror unit 174. The control unit 110 includes an image processing unit 120, a laser light control unit 130, and a scan control unit 140. The control unit 110 receives an input of display image data representing a display image.

The control unit 110 is constituted by a processor such as a central processing unit (CPU). In other words, the control unit 110 has a function of a computer. The control unit 110 executes a program stored in a storage device such as the flash memory 152 or the EEPROM 156 and carries out various processes. In addition, upon executing the program, the control unit 110 implements constituent elements such as the image processing unit 120, the laser light control unit 130, and the scan control unit 140. The constituent elements of the control unit 110 may be implemented not only by the software rendered by the program but also by any combination of hardware, firmware, and software. In addition, the constituent elements of the control unit 110 may be implemented, for example, by a user-programmable integrated circuit, such as a field-programmable gate array (FPGA) or a microcomputer. In this case, the control unit 110 may implement the program constituted by the above-described constituent elements by using the stated integrated circuit.

The DDR memory 150 is a frame buffer that temporarily stores image data to be input to the image processing unit 120 of the control unit 110. The DDR memory 150 may be DDR2, DDR3, or a synchronous dynamic random-access memory (SDRAM). The flash memory 152 is a nonvolatile storage unit that stores data, programs, and so on necessary for the operation of the image processing unit 120. The microcomputer 154 causes the scan control unit 140 to generate a driving signal for causing the scanner driver 172 to operate. The EEPROM 156 is a nonvolatile storage unit that stores data, programs, and so on necessary for the operation of the scan control unit 140.

The laser light source unit 160 outputs laser light toward the scan mirror unit 174. The laser driver 164 drives the laser diode 162 in accordance with the control of the laser light control unit 130. Specifically, the laser driver 164 drives the laser diode 162 at a lighting timing and a driving current that accord with the control of the laser light control unit 130. In a case in which the laser diode 162 is constituted by a plurality of laser diodes, the laser driver 164 drives each of the plurality of laser diodes.

The laser diode 162 outputs laser light serving as a light source. The laser diode 162 is constituted by, for example, a red laser diode 162R, a green laser diode 162G, and a blue laser diode 162B. The configuration of the laser diode 162, however, is not limited to this example. The laser diode 162 may include a laser diode that outputs laser light of another color. In addition, the laser diode 162 may be constituted by a single laser diode.

The laser light source unit 160 further includes a mirror for combining the laser light output from each of the red laser diode 162R, the green laser diode 162G, and the blue laser diode 162B and for guiding the combined laser light to the scan mirror unit 174. Thus, the laser light from the laser light source unit 160 is directed into the scan mirror unit 174. The laser light output from the laser diode 162 can exhibit a variety of drawing colors and drawing modes as the laser light control unit 130 controls the laser driver 164 and the driving current and the driving time of each laser diode are thus controlled.

The scan mirror unit 174 is driven by the scanner driver 172. The scan mirror unit 174 reflects the laser light coming from the laser light source unit 160 to scan the laser light over a screen 200 and thus has a display image corresponding to the display image data drawn onto the screen 200. The scan mirror unit 174 includes a horizontal scan mirror 178 and a vertical scan mirror 179. The horizontal scan mirror 178 reflects the laser light to scan the laser light over the screen 200 in the horizontal direction. The vertical scan mirror 179 reflects the laser light to scan the laser light over the screen 200 in the vertical direction. The horizontal scan mirror 178 and the vertical scan mirror 179 can each be constituted, for example, by a scan mirror such as a microelectromechanical system (MEMS).

The scanner driver 172 causes the scan mirrors constituting the scan mirror unit 174 to operate in accordance with the control of the scan control unit 140. The scanner driver 172 includes a horizontal scanner driver 176 that causes the horizontal scan mirror 178 to operate and a vertical scanner driver 177 that causes the vertical scan mirror 179 to operate.

Under the control of the scan control unit 140, the horizontal scanner driver 176 supplies the horizontal scan mirror 178 with a driving voltage for causing the horizontal scan mirror 178 to oscillate at a predetermined frequency. Under the control of the scan control unit 140, the vertical scanner driver 177 supplies the vertical scan mirror 179 with a driving voltage for causing the vertical scan mirror 179 to oscillate at a predetermined frequency.

In the foregoing description of the optical path of the laser light output from the laser light source unit 160, the horizontal scan mirror 178 scans the laser light, and then the vertical scan mirror 179 scans the laser light. However, this configuration is not a limiting example. The order in which the horizontal scan mirror 178 and the vertical scan mirror 179 scan the laser light may be reversed. In addition, the vertical scan mirror and the horizontal scan mirror may be integrated.

The image processing unit 120 acquires the display image data from the DDR memory 150. Then, the image processing unit 120 outputs the display image data to the laser light control unit 130 in tune with a predetermined dot clock so that the laser light control unit 130 can scan the laser light in accordance with the display image data.

The image processing unit 120 includes a condition determining unit 122, a luminance determining unit 124, and a scan image acquiring unit 126. With these constituent elements, the image processing unit 120 carries out image processing on the display image data so as to change the luminance of each region in the display image data, depending on the condition of the surroundings of the image display apparatus 100. In this case, the image processing unit 120 generates scan image data obtained by subjecting the display image data to the image processing. Then, the image processing unit 120 carries out the above-described processing on the scan image data for scanning the laser light and outputs the scan image data to the laser light control unit 130. Hereinafter, when the display image data and the scan image data are not distinguished therebetween, they may be simply referred to as image data.

The laser light control unit 130 controls the laser light source unit 160 so that the display image corresponding to the display image data is displayed on the screen 200. The laser light control unit 130 controls the laser driver 164 so that the laser light is output appropriately from the laser diode 162 in accordance with the display image data or the scan image data. Specifically, the laser light control unit 130 controls the laser driver 164 so that the laser light is output at an appropriate timing and at an appropriate output value in accordance with the image data. More specifically, the laser light control unit 130 controls the ON/OFF and the laser output value of each laser diode 162 driven by the laser driver 164 so that the display image corresponding to the image data is drawn on the screen 200. In addition, the laser light control unit 130 controls synchronization processing between the operation of the laser light source unit 160 and the operation of the scanner unit 170.

The scan control unit 140 controls the scan mirror unit 174 so that the display image corresponding to the display image data is displayed on the screen 200. The scan control unit 140 controls the deflection angle, the scan frequency, and so on of each of the horizontal scan mirror 178 and the vertical scan mirror 179 constituting the scan mirror unit 174. The scan control unit 140 generates a driving voltage waveform and supplies the driving voltage waveform to the scanner driver 172 so that the scan mirror unit 174 can obtain a desired deflection angle, a desired frequency, and so on. The scan control unit 140 includes a scan waveform acquiring unit 142. When the image processing unit 120 has generated scan image data, the scan waveform acquiring unit 142 determines the scan speed in the vertical scan direction, namely, the vertical scan speed. In this case, the vertical scan speed is not constant within one frame. This will be described later in detail.

Figure 2:
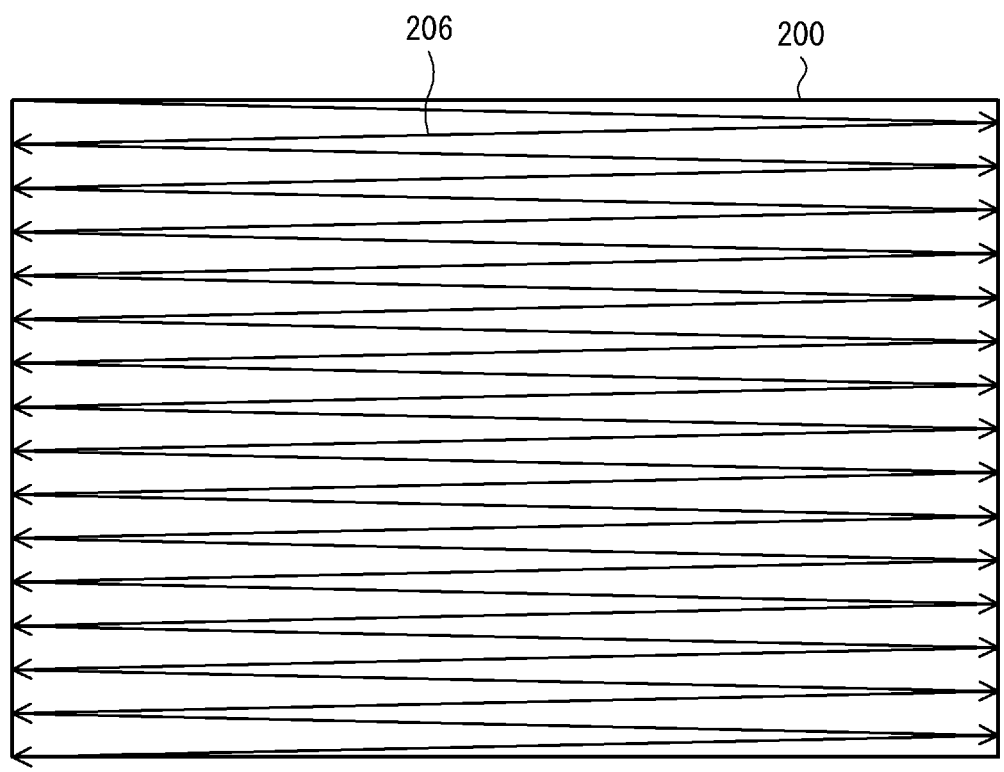
FIG. 2 illustrates a state in which the laser light is scanned over the screen.

FIG. 2 illustrates a state in which the laser light is scanned over the screen 200. FIG. 2 illustrates a state in which the vertical scan speed is constant. The laser light is scanned in the vertical direction from the top to the bottom while being scanned to reciprocate laterally in the horizontal direction as indicated by the scan lines, or laser scan loci 206, as the horizontal scan mirror 178 and the vertical scan mirror 179 oscillate. When the laser light returns from the bottom to the top, the laser light may be scanned in the vertical direction from the bottom to the top in the reverse direction of that of FIG. 2, or the vertical scan mirror 179 may be brought to be at the upper-end deflection angle without a scan.

One instance of a scan from the left to the right or from the right to the left in the horizontal direction is referred to as one line. The total number of lines, or the scan number, is set constant in each frame. The total number of lines is determined by the resolution of each frame in the display image. As a specific example, as the horizontal scan mirror 178 oscillates to draw one frame, 520 reciprocations of the laser scan loci 206 in the horizontal direction are scanned, that is, 1040 laser scan loci 206 are scanned. In addition, the oscillation of the vertical scan mirror 179 makes one reciprocation in the vertical direction when drawing one frame. When a scan of 60 reciprocations per second is carried out, for example, 60 frames of images are drawn per second. This number of frames drawn in one second is referred to as a frame rate. The reciprocal of the frame rate, namely, the time it takes to draw one frame is referred to as a frame scan time. When the vertical scan speed is set to a constant scan speed, the frame scan time is constant.

Although the scan speed in the horizontal direction, namely, the horizontal scan speed is constant in the present exemplary embodiment, the vertical scan speed is not necessarily constant. In the present exemplary embodiment, the laser light is scanned with the vertical scan speed set constant in the case of a normal operation. Meanwhile, the vertical scan speed is not constant when a predetermined condition is satisfied. The image display apparatus 100 according to the present exemplary embodiment is configured to have a constant frame scan time, namely, a constant frame rate and a constant frame size even when the vertical scan speed is not constant. Hereinafter, the "predetermined condition" may be referred to as a "speed changing condition".

In reality, it is not that the laser light is luminous over the entire surface of the screen 200 even when the scan mirror unit 174 scans the laser light over the entire surface of the screen 200. In other words, the screen 200 includes a region that is scanned with the laser light to have a display image drawn and a blanking area that is neither scanned with the laser light nor used to draw a display image. The blanking area can be present at each of the top, bottom, right, and left end portions of the screen 200. In the following description, the assumption is that no such blanking area is present, but when a blanking area is present, the deflection angle in the vertical scan direction may be adjusted as appropriate.

Hereinafter, the condition determining unit 122, the luminance determining unit 124, the scan image acquiring unit 126, and the scan waveform acquiring unit 142 of the control unit 110 will be described further. These constituent elements need not be included in the image processing unit 120 or the scan control unit 140. The scan waveform acquiring unit 142 may be included in the image processing unit 120.

The condition determining unit 122 determines the condition of the surrounding of the image display apparatus 100. Herein, "the condition of the surroundings" concerns with, but is not limited to, for example, the brightness of the surroundings of the image display apparatus 100, the urgency level of the device in which the image display apparatus 100 is mounted, and so on. The first exemplary embodiment illustrates an example in which "the condition of the surroundings" concerns with the brightness of the surroundings of the image display apparatus 100. In other words, the speed changing condition according to the first exemplary embodiment concerns with the brightness of the surroundings.

The condition determining unit 122 receives a signal indicating the condition of the surroundings from a sensor or the like and determines the condition of the surroundings on the basis of the signal. Then, the condition determining unit 122 determines not to set the vertical scan speed in one frame constant in a case in which the condition of the surroundings satisfies a predetermined condition, namely, the speed changing condition. In this case, the condition determining unit 122 causes the luminance determining unit 124, the scan image acquiring unit 126, and the scan waveform acquiring unit 142 to operate. Meanwhile, in a case in which the condition of the surroundings does not satisfy the speed changing condition, the condition determining unit 122 determines to scan each frame at a constant vertical scan speed. In this case, the luminance determining unit 124, the scan image acquiring unit 126, and the scan waveform acquiring unit 142 need not operate.

The luminance determining unit 124 determines the luminance of a region of the display image data in which a content is present, namely, a content present region (first region). Herein, a content is a drawing pattern, within the display image data, for providing a user with certain information. For example, in a case in which the image display apparatus 100 is a head-up display mounted in a vehicle, the content is the display of the speed, the display of an arrow indicating that there is a curve or an intersection in the traveling direction, the display of a certain warning, or the like.

The luminance determining unit 124 sets the luminance of the content present region higher than the luminance thereof set when the condition of the surroundings does not satisfy the predetermined condition. Meanwhile, the luminance determining unit 124 sets the luminance of a region in which no content is present, namely, a content absent region (second region) lower than the luminance thereof set when the condition of the surroundings does not satisfy the predetermined condition. In other words, when the condition of the surroundings satisfies the predetermined condition, the content present region is displayed brightly, and the content absent region is displayed dimly. Thus, the user can visually recognize the content in the content present region with ease. Since no content is present in the content absent region, displaying the content absent region dimly does not cause any inconvenience to the user. The luminance determining unit 124 sets the luminances such that the mean luminance of the luminance of the content present region and the luminance of the content absent region is equal to the mean luminance thereof set when the condition of the surroundings does not satisfy the predetermined condition.

The scan image acquiring unit 126 carries out image processing on the display image data to increase the length of the content present region in the vertical scan direction in accordance with the luminance determined by the luminance determining unit 124. Then, the scan image acquiring unit 126 acquires scan image data through this image processing. At this point, the scan image acquiring unit 126 increases the length of the content present region in the vertical scan direction further as the luminance is higher.

The scan waveform acquiring unit 142 sets the vertical scan speed in the content present region to a speed (first speed) lower than the constant scan speed in accordance with the luminance determined by the luminance determining unit 124. In addition, the scan waveform acquiring unit 142 sets the vertical scan speed in the content absent region to a speed (second speed) higher than the constant scan speed in accordance with the luminance determined by the luminance determining unit 124. At this point, the scan waveform acquiring unit 142 determines the vertical scan speed so that the frame scan time is constant. Then, the scan waveform acquiring unit 142 generates, or acquires, a scan waveform indicating the vertical scan speeds in the content present region and the content absent region.

Herein, the vertical scan speed may be an angular speed in the vertical scan direction, namely, the angular speed of the deflection angle of the vertical scan mirror 179 or may be the deflection angle per line when the lines in the horizontal direction are scanned. The latter is employed in the present exemplary embodiment. The scan waveform acquiring unit 142 generates a scan waveform indicating the relationship between the lines and the deflection angles in each frame. The scan control unit 140 controls the scanner driver 172 in accordance with this scan waveform. In the following, when the content present region and the content absent region are not distinguished therebetween, they are referred to simply as a region or each region. In the present exemplary embodiment, the display luminance of the content displayed in the content present region is set higher when the speed changing condition is satisfied. Therefore, the predetermined condition, namely, the speed changing condition can be said to be a condition on which the content displayed in the content present region is displayed at a higher display luminance.

Figure 3:
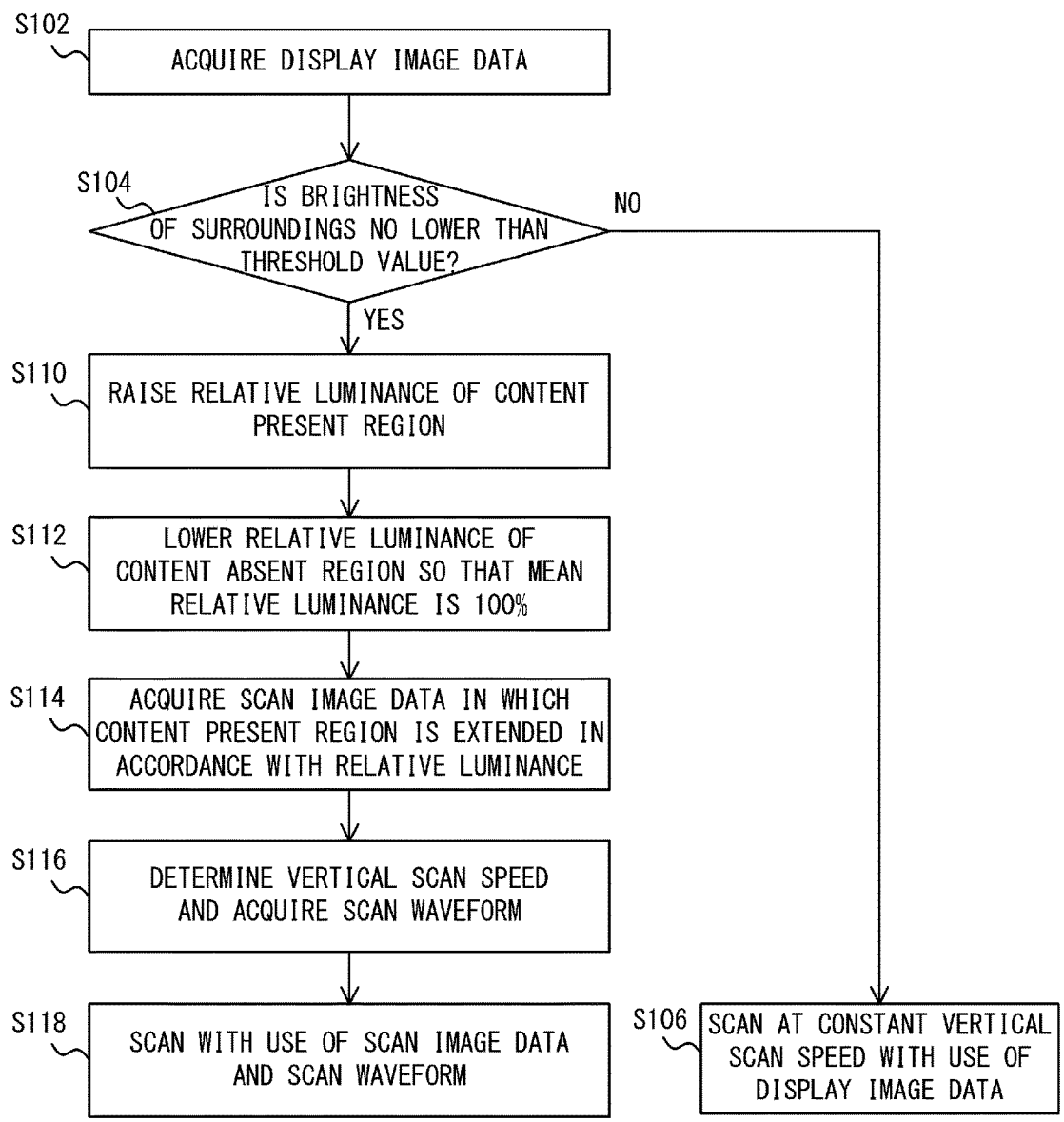
FIG. 3 is a flowchart illustrating an image display method implemented by the image display apparatus according to the first exemplary embodiment.

FIG. 3 is a flowchart illustrating an image display method implemented by the image display apparatus 100 according to the first exemplary embodiment. First, the image processing unit 120 acquires display image data (step S102). Next, the condition determining unit 122 determines whether the brightness of the surroundings is no lower than a threshold value (step S104). The "brightness" may be indicated, for example, by the illuminance (lux), the quantity of light (luminous flux), the luminance, or the lightness.

Specifically, the image display apparatus 100 is provided with a brightness sensor, such as an illuminance sensor, that measures the brightness. The condition determining unit 122 acquires a signal indicating the brightness from the brightness sensor. Then, the condition determining unit 122 determines whether the brightness of the surroundings is no lower than a predetermined threshold value on the basis of the signal indicating the brightness. If it is determined that the brightness of the surroundings is lower than the threshold value (NO in S104), the control unit 110 carries out control to scan the laser light at a constant vertical scan speed, namely, in a normal operation with the use of unmodified display image data and causes the display image to be displayed on the screen 200 (step S106).

On the other hand, if it is determined that the brightness of the surroundings is no lower than the threshold value (YES in S104), the luminance determining unit 124 raises the relative luminance of the content present region (step S110). Herein, the relative luminance refers to the luminance relative to the luminance set in the case of the constant vertical scan speed (i.e., in the case of the normal operation). When the relative luminance set in the case of the normal operation is considered as 100%, for example, the relative luminance of 150% means that the luminance is 1.5 times the luminance set in the case of the normal operation.

The luminance determining unit 124 lowers the relative luminance of the content absent region so that the mean relative luminance is 100% (step S112). Herein, the mean relative luminance is a value obtained by dividing the total of the products between the ranges (deflection angles) in the vertical scan direction of the respective regions and the relative luminances of the respective regions by the range (deflection angle) from the upper end to the lower end of the display image.

The scan image acquiring unit 126 acquires scan image data in which the content present region is extended in the vertical scan direction as compared to the content present region in the display image data in accordance with the relative luminance determined by the luminance determining unit 124 (step S114). The scan image acquiring unit 126 increases the length of the content present region in the vertical scan direction further as the relative luminance is higher. For example, the scan image acquiring unit 126 carries out image processing to extend the content present region by 1.5-fold in the vertical scan direction when the relative luminance of the content present region is 150%. The length of the content absent region in the vertical scan direction may be reduced in accordance with the relative luminance, or the length need not be changed. In a case in which the length of the content absent region in the vertical scan direction is not changed, the extended content present region overlaps the content absent region.

The scan waveform acquiring unit 142 determines the vertical scan speed of the display image data in accordance with the luminance determined by the luminance determining unit 124 and acquires a scan waveform indicating the determined vertical scan speed (step S116). Then, the control unit 110 carries out control to scan the laser light with the use of the scan image data and the scan waveform and causes the display image to be displayed on the screen 200 (step S118). Specifically, the laser light control unit 130 controls the laser driver 164 in accordance with the scan image data. In addition, the scan control unit 140 controls the scanner driver 172 in accordance with the scan waveform.

In the control of the laser light control unit 130, the width in each line to be scanned in the scan image data is constant. Meanwhile, in the control of the scan control unit 140, the vertical scan speed is lower in the content present region and higher in the content absent region. Since the content present region is being extended in the vertical scan direction, in the display image displayed on the screen 200, the density of the lines in the content present region is higher, and the density of the lines in the content absent region is lower. Thus, the luminance of the content present region is higher, and the luminance of the content absent region is lower.

Hereinafter, descriptions are given with specific display images illustrated as examples. In the examples of the display image illustrated hereinafter, the image display apparatus 100 is a head-up display mounted in a vehicle. The display image is not limited to the examples illustrated hereinafter. Each of the examples of the display image illustrated hereinafter can also be applied to other exemplary embodiments.

Figure 4:
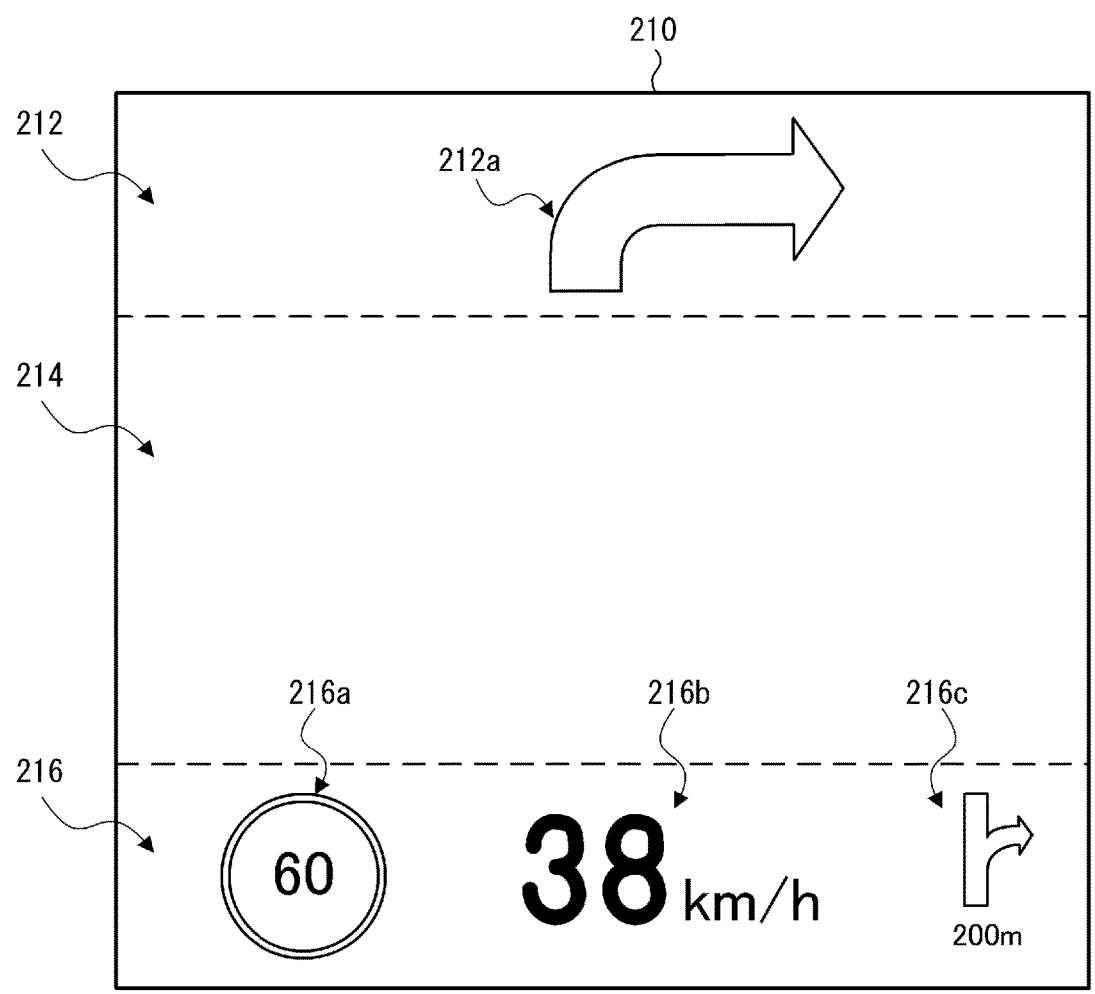
FIG. 4 illustrates a first example of the display image.

FIG. 4 illustrates a first example of the display image. A display image 210 of the first example is composed of a content present region 212, a content absent region 214, and a content present region 216. The content present region 212 includes a content 212a indicating a right curve. The content present region 216 includes a content 216a indicating the speed limit, a content 216b indicating the current speed, and a content 216c indicating the distance to the curve.

The deflection angle width held when the display image 210 is scanned in the vertical scan direction from the upper end to the lower end is 2.0. In other words, the relative deflection angle at the upper end of the display image 210 is 0, and the relative deflection angle at the lower end is 2.0. In this case, the content present region 212 is a region corresponding to the relative deflection angles ranging from 0 to 0.5 (deflection angle width of 0.5). The content absent region 214 is a region corresponding to the relative deflection angles ranging from 0.5 to 1.5 (deflection angle width of 1.0). The content present region 216 is a region corresponding to the relative deflection angles ranging from 1.5 to 2.0 (deflection angle width of 0.5).

Figure 5:
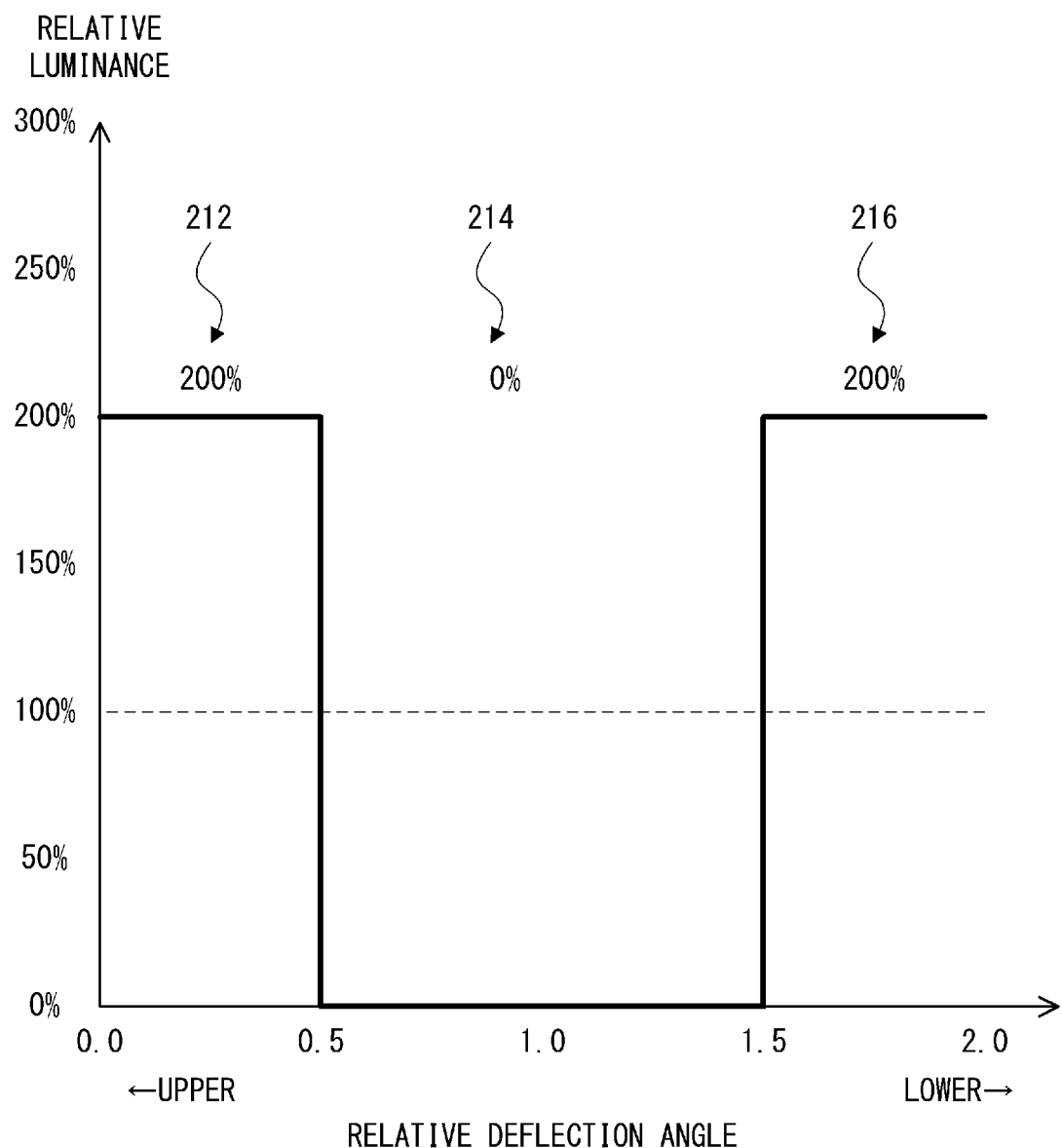
FIG. 5 illustrates the relative luminance of each region in the display image of the first example according to the first exemplary embodiment.

FIG. 5 illustrates the relative luminance of each region in the display image 210 of the first example according to the first exemplary embodiment. In the example illustrated in FIG. 5, the luminance determining unit 124 sets the relative luminance of the content present region 212 to 200% and the relative luminance of the content present region 216 to 200%. The content present region 212 and the content present region 216 have the same relative luminance in the example illustrated in FIG. 5 but need not have the same relative luminance. The luminance determining unit 124 sets the relative luminance of the content absent region 214 such that the mean relative luminance is 100%. Thus, the frame scan time can be made constant, as will be described later.

Specifically, the luminance determining unit 124 determines the relative luminance of the content absent region 214 such that the value obtained by dividing the total of the products between the deflection angle widths of the respective regions and their relative luminances by the deflection angle width of 2.0 from the upper end to the lower end is 100%. In the example illustrated in FIG. 5, the relative luminance of the content absent region 214 is 0%. When the relative luminance of the content present region is lowered with the lower limit being 100%, the relative luminance of the content absent region is raised with the upper limit being 100%. The maximum value of the relative luminance of the content present region is set in accordance with the relative luminances of other regions. In other words, setting the relative luminance of the content absent region to 0% allows the relative luminance of the content present region to be set higher. This also applies in other exemplary embodiments.

Figure 6:
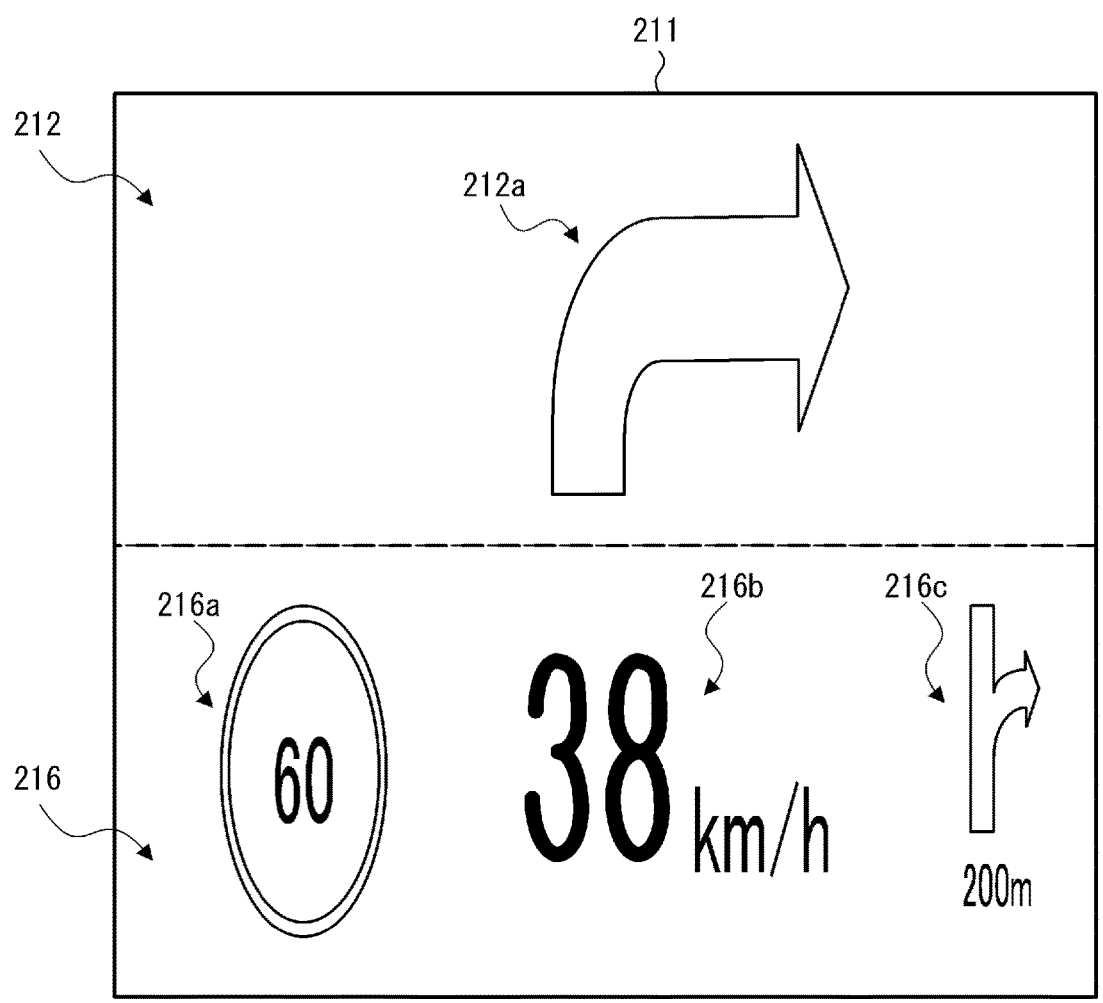
FIG. 6 illustrates a scan image represented by scan image data generated for the display image of the first example in the example illustrated in FIG. 5.

FIG. 6 illustrates a scan image 211 represented by scan image data generated for the display image 210 of the first example in the example illustrated in FIG. 5. Since the relative luminance of the content present region 212 is 200%, the scan image acquiring unit 126 increases the length of the content present region 212 in the vertical scan direction to twice the length in the display image 210. In a similar manner, since the relative luminance of the content present region 216 is 200%, the scan image acquiring unit 126 increases the length of the content present region 216 in the vertical scan direction to twice the length in the display image 210. In this case, since the content absent region 214 is located in the middle portion of the display image 210 in the vertical scan direction, the scan image acquiring unit 126 extends each of the content present region 212 and the content present region 216 toward the middle in the vertical scan direction. Thus, the scan image acquiring unit 126 acquires the scan image data representing the scan image 211 illustrated in FIG. 6.

Figure 7:
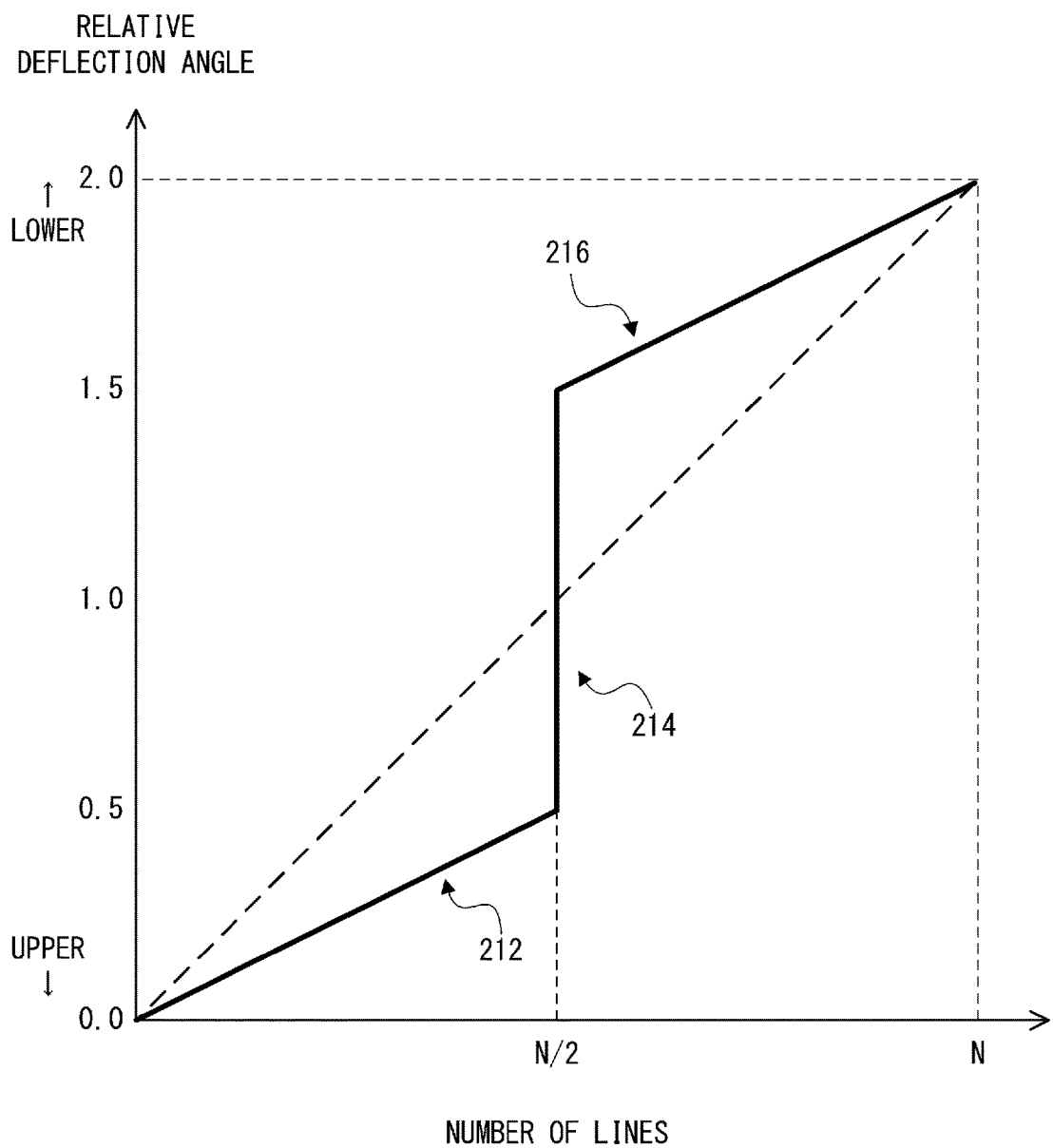
FIG. 7 illustrates a scan waveform for the display image of the first example in the example illustrated in FIG. 5.

FIG. 7 illustrates a scan waveform for the display image 210 of the first example in the example illustrated in FIG. 5. In the scan waveform illustrated in FIG. 7, the horizontal axis represents the number of lines in the scan image 211, and the vertical axis represents the relative deflection angle. The total number of lines is N. The downward direction along the vertical axis corresponds to the upward direction of the display image 210. In FIG. 7, a scan waveform held when the speed is constant is indicated by the dashed line. In addition, in FIG. 7, the vertical scan speed is indicated by the slope relative to the horizontal axis. In other words, in the scan waveform illustrated in FIG. 7, a portion with a smaller slope corresponds to a portion with a lower vertical scan speed.

The scan waveform acquiring unit 142 determines the vertical scan speed in each region in accordance with the relative luminance of each region. Specifically, the scan waveform acquiring unit 142 sets the vertical scan speed lower as the relative luminance is higher. More specifically, the scan waveform acquiring unit 142 determines the vertical scan speed so as to be inversely proportional to the relative luminance.

For example, since the relative luminance of the content present region 212 is 200%, the scan waveform acquiring unit 142 sets the speed to one-half the constant speed in the segment corresponding to the content present region 212 with the relative deflection angles ranging from 0 to 0.5. In a similar manner, since the relative luminance of the content present region 216 is 200%, the scan waveform acquiring unit 142 sets the speed to one-half the constant speed in the segment corresponding to the content present region 216 with the relative deflection angles ranging from 1.5 to 2.0. Meanwhile, since the relative luminance of the content absent region 214 is 0%, the scan waveform acquiring unit 142 sets the speed to a substantially infinite speed in the segment corresponding to the content absent region 214 with the relative deflection angles ranging from 0.5 to 1.5. Thus, the relative deflection angle becomes 2.0 when the number of lines is N, as in the case in which the vertical scan speed is constant. In other words, the frame scan time is constant even when the vertical scan speed is lowered in the content present regions.

Figure 8:
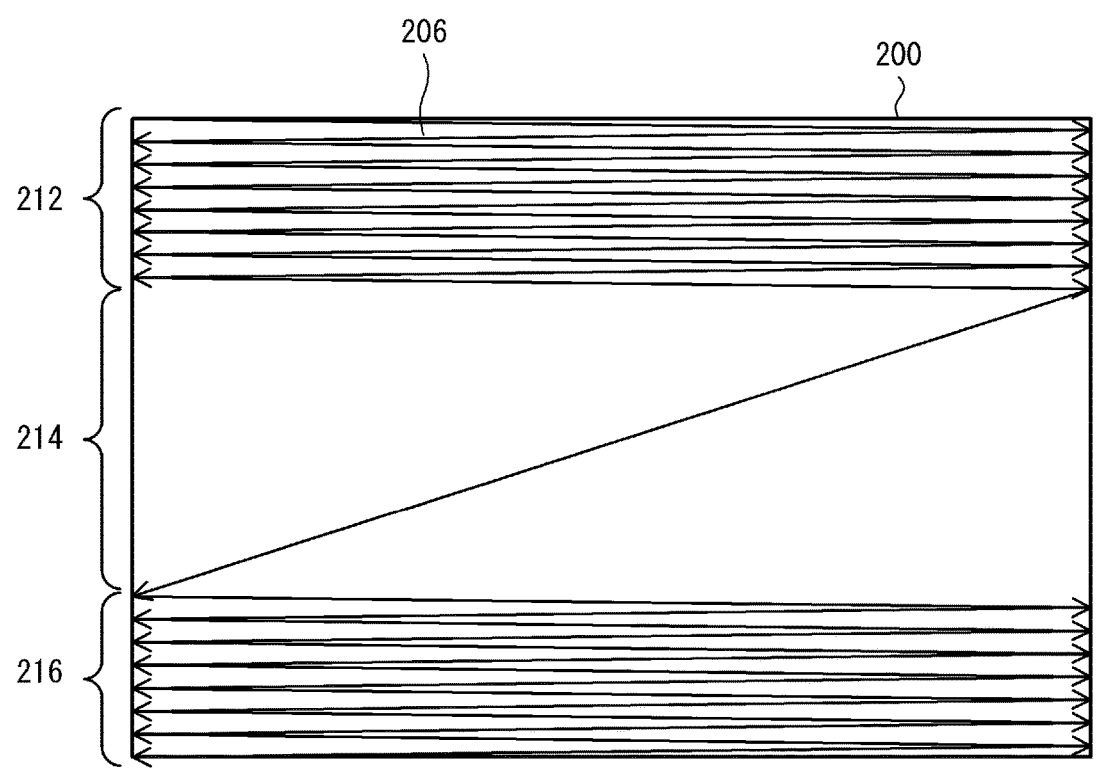
FIG. 8 illustrates laser scan loci obtained when the display image of the first example is projected onto the screen with the use of the scan image data according to the example illustrated in FIG. 5.

FIG. 8 illustrates laser scan loci 206 obtained when the display image 210 of the first example is projected onto the screen 200 with the use of the scan image data according to the example illustrated in FIG. 5. The laser scan loci 206 illustrated in FIG. 8 correspond to loci obtained when the scan image 211 illustrated in FIG. 6 is projected with the use of the scan waveform illustrated in FIG. 7. Specifically, the vertical scan speed is being lowered in the content present region 212 and the content present region 216, and the vertical scan speed is being raised in the content absent region 214. In addition, the density of the lines is higher in the content present region 212 and the content present region 216. Meanwhile, the density of the lines is lower in the content absent region 214. Thus, the display image 210 illustrated in FIG. 4 is displayed on the screen 200.

Since the density of the lines is higher in the content present region 212 and the content present region 216, the relative luminance of the content present region 212 and the content present region 216 is higher. In this case, as described with reference to FIG. 7, the frame scan time and the frame size can be made constant as the vertical scan speed in the content absent region 214 is being raised. Therefore, according to the present exemplary embodiment, when the surroundings are bright, the luminance of the content present region can be raised while the frame scan time and the frame size are kept constant.

Since the density of the lines is higher in the content present region 212 and the content present region 216, the resolution of the content present region 212 and the content present region 216 is higher. In other words, according to the present exemplary embodiment, the visibility of the content to the user can be improved as the resolution of the content present regions is increased. This also applies in other exemplary embodiments described hereinafter.

The scan image acquiring unit 126 according to the present exemplary embodiment generates scan image data in which a content present region is extended in the vertical scan direction, but the present exemplary embodiment is not limited to such a configuration. For example, a storage device such as the flash memory 152 may store scan image data corresponding to display image data in advance. Storing scan image data in advance makes it possible to reduce the time it takes for image processing. On the other hand, generating scan image data from display image data makes it possible to suppress an increase in the capacity of the storage device. This also applies in other exemplary embodiments described hereinafter.

Furthermore, the control unit 110 according to the foregoing exemplary embodiment carries out control of raising the luminance of a content present region with the use of scan image data, but the exemplary embodiment is not limited to such a configuration. The control unit 110 may carry out control of raising the luminance of a content present region without the use of scan image data. For example, when a content present region is scanned, the laser light control unit 130 may read out data a plurality of times (e.g., twice) per line, and the scan control unit 140 may control the scanner driver 172 to scan a plurality of times (e.g., twice) per line.

On the other hand, the use of scan image data renders a complex operation on hardware as described above unnecessary, and thus the control of the laser light control unit 130 and the scan control unit 140 can be made simpler. In other words, synchronization processing between the operation of the laser light control unit 130 and the operation of the scan control unit 140 can be carried out with ease. This also applies in other exemplary embodiments described hereinafter.

In the foregoing exemplary embodiment, the luminance determining unit 124 determines the luminance of a content present region, and the vertical scan speed is determined in accordance with the determined luminance. Such a configuration makes it easier for the scan control unit 140 to control the scanner driver 172 so as to achieve the determined luminance.

Second Exemplary Embodiment

Next, a second exemplary embodiment will be described. The second exemplary embodiment differs from the first exemplary embodiment in that the determination as to whether the vertical scan speed is kept constant is made on the basis of the urgency level of the content. In other words, in the second exemplary embodiment, the speed changing condition concerns with the urgency. The hardware configuration of an image display apparatus 100 according to the second exemplary embodiment is substantially the same as that of the first exemplary embodiment, and thus descriptions thereof will be omitted. The "urgency" concerns with a case in which the distance between the vehicle and another vehicle in front is too short, a case in which the speed of the vehicle is over the speed limit, a case in which the distance to a curve or an intersection is too short, or the like, but these are not limiting examples. The second exemplary embodiment describes an example in which the urgency concerns with a case in which the distance between the vehicle and another vehicle in front is too short.

Figure 9:
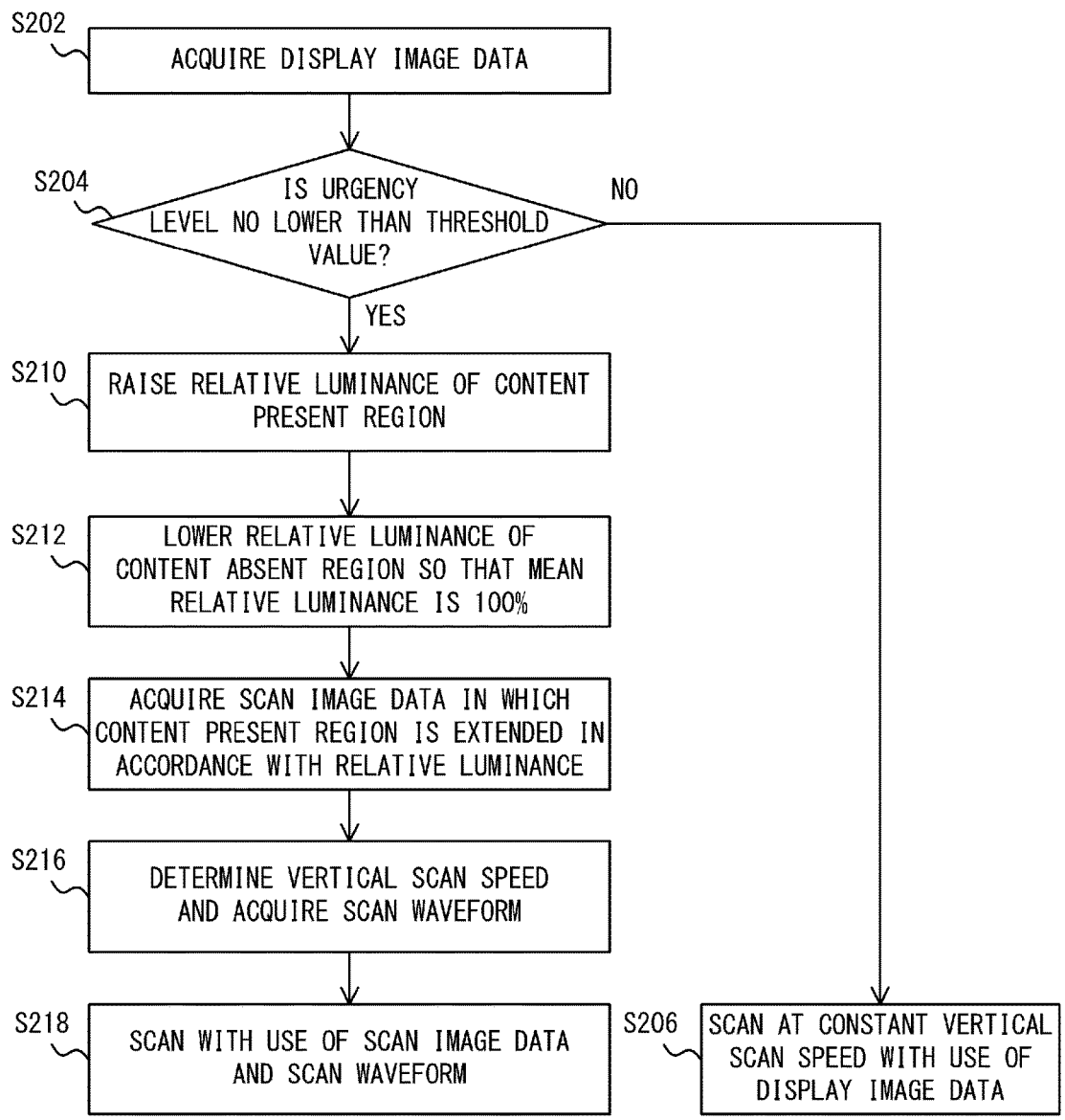
FIG. 9 is a flowchart illustrating an image display method implemented by the image display apparatus according to a second exemplary embodiment.

FIG. 9 is a flowchart illustrating an image display method implemented by the image display apparatus 100 according to the second exemplary embodiment. First, the image processing unit 120 acquires display image data (step S202). Next, the condition determining unit 122 determines whether the urgency level is no lower than a threshold value (step S204). The urgency level of a content is the degree of urgency in displaying the content. For example, when the urgency concerns with a case in which the distance between the vehicle and another vehicle in front is too short, as the distance between the vehicle and the vehicle in front is shorter, the urgency level of the content for notifying the user to that effect, namely, the content for a warning increases. Meanwhile, when the urgency concerns with a case in which the speed of the vehicle is over the speed limit, as the amount by which the speed exceeds the speed limit is greater, the urgency level of the content for warning to that effect increases. Furthermore, when the urgency concerns with a case in which the distance to a curve or an intersection is too short, as the distance to the curve or the intersection is shorter, the urgency level of the content for warning to that effect increases.

Specifically, the image display apparatus 100 is provided, for example, with a distance sensor or the like that measures the distance between the vehicle and another vehicle in front. The condition determining unit 122 acquires a signal indicating the distance to a vehicle in front from the distance sensor. The condition determining unit 122 determines the urgency level on the basis of the signal indicating the distance to the vehicle in front. Then, the condition determining unit 122 determines whether the urgency level concerning with the distance to the vehicle in front is no lower than a predetermined threshold value. If it is determined that the urgency level is lower than the threshold value (NO in S204), in a similar manner to S106 illustrated in FIG. 3, the control unit 110 carries out control to scan the laser light at a constant vertical scan speed, namely, in a normal operation and causes the display image to be displayed on the screen 200 (step S206).

On the other hand, if it is determined that the urgency level is no lower than the threshold value (YES in S204), the luminance determining unit 124 raises the relative luminance of a content present region (step S210) and lowers the relative luminance of a content absent region (step S212) so that the mean relative luminance is 100%. The processing in S210 to S218 is substantially the same as the processing in S110 to S118, respectively, illustrated in FIG. 3, and thus descriptions thereof will be omitted.

Figure 10:
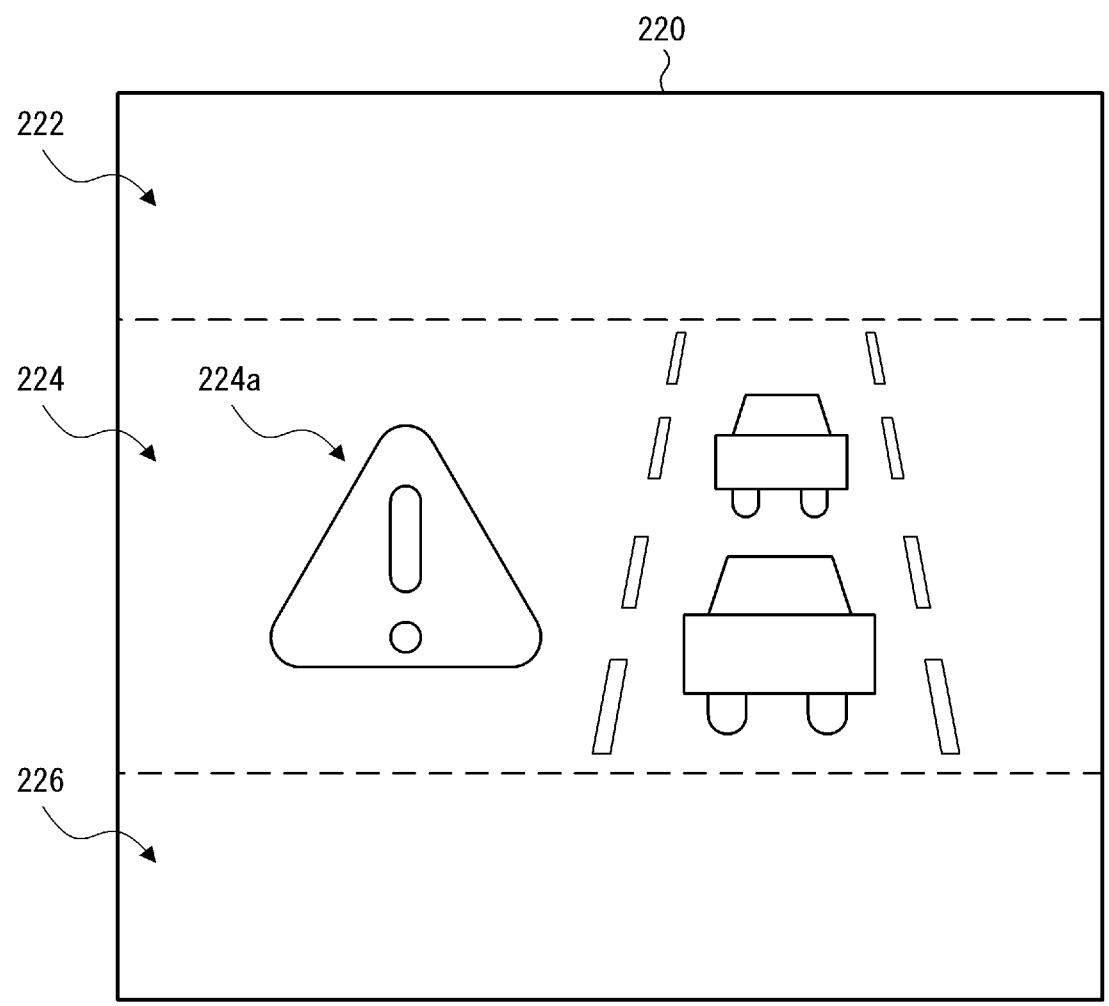
FIG. 10 illustrates a second example of the display image.

FIG. 10 illustrates a second example of the display image. A display image 220 of the second example is composed of a content absent region 222, a content present region 224, and a content absent region 226. The content present region 224 includes a content 224a indicating that the distance to the vehicle in front is short.

The content absent region 222 is a region corresponding to the relative deflection angles ranging from 0 to 0.5 (deflection angle width of 0.5). The content present region 224 is a region corresponding to the relative deflection angles ranging from 0.5 to 1.5 (deflection angle width of 1.0). The content absent region 226 is a region corresponding to the relative deflection angles ranging from 1.5 to 2.0 (deflection angle width of 0.5).

Figure 11:
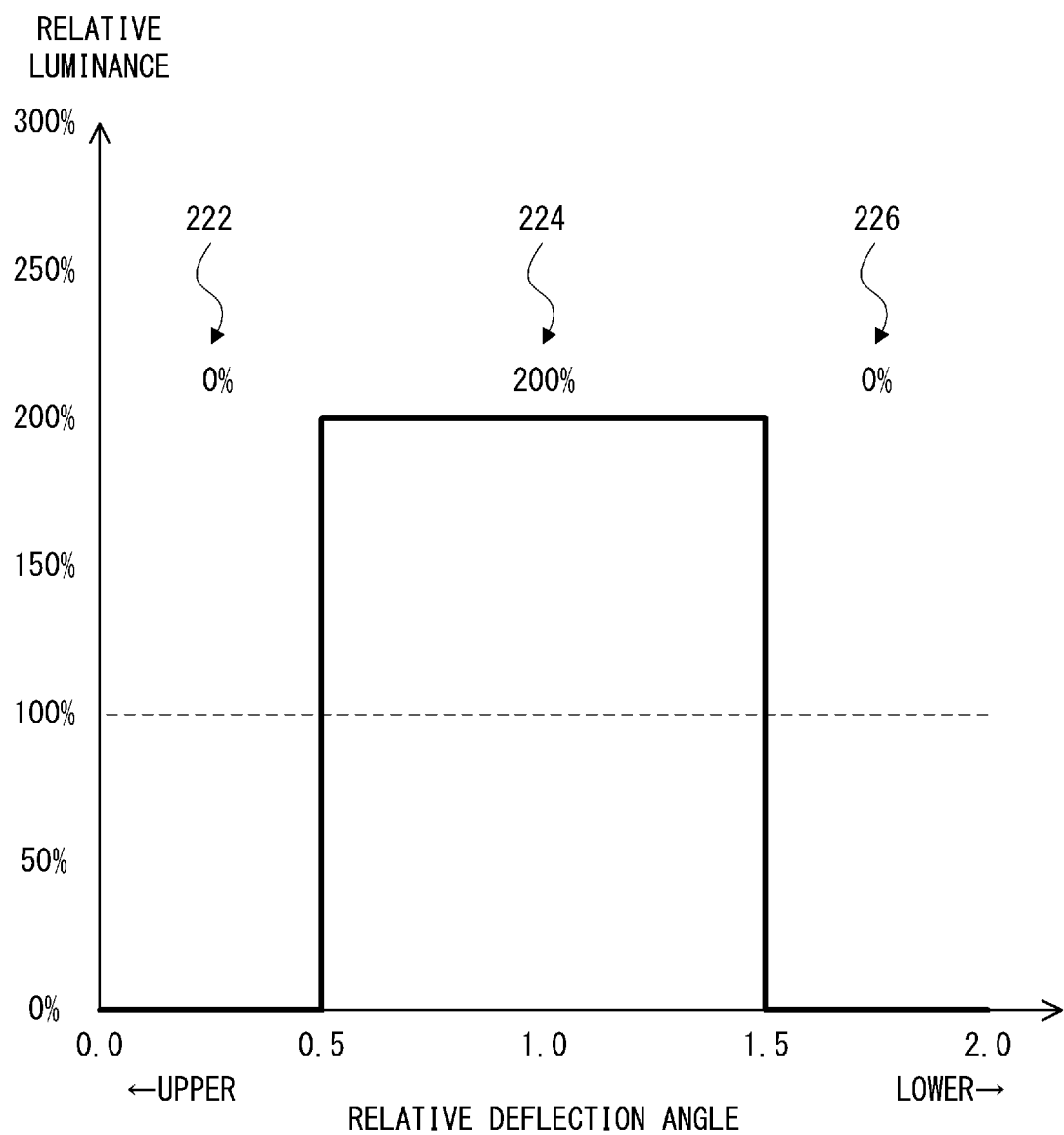
FIG. 11 illustrates the relative luminance of each region in the display image of the second example according to the second exemplary embodiment.

FIG. 11 illustrates the relative luminance of each region in the display image 220 of the second example according to the second exemplary embodiment. In the example illustrated in FIG. 11, the luminance determining unit 124 sets the relative luminance of the content present region 224 to 200%. In addition, the luminance determining unit 124 sets the luminance of the content absent region 222 and the content absent region 226 so that the mean relative luminance is 100%. Thus, the frame scan time can be made constant, as will be described later. Specifically, the luminance determining unit 124 determines the relative luminance of the content absent region 222 and the content absent region 226 such that the value obtained by dividing the total of the products between the deflection angle widths of the respective regions and the relative luminance by the deflection angle width of 2.0 from the upper end to the lower end becomes 100%. In the example illustrated in FIG. 11, the relative luminance of the content absent region 222 and the relative luminance of the content absent region 226 are both 0%.

Figure 12:
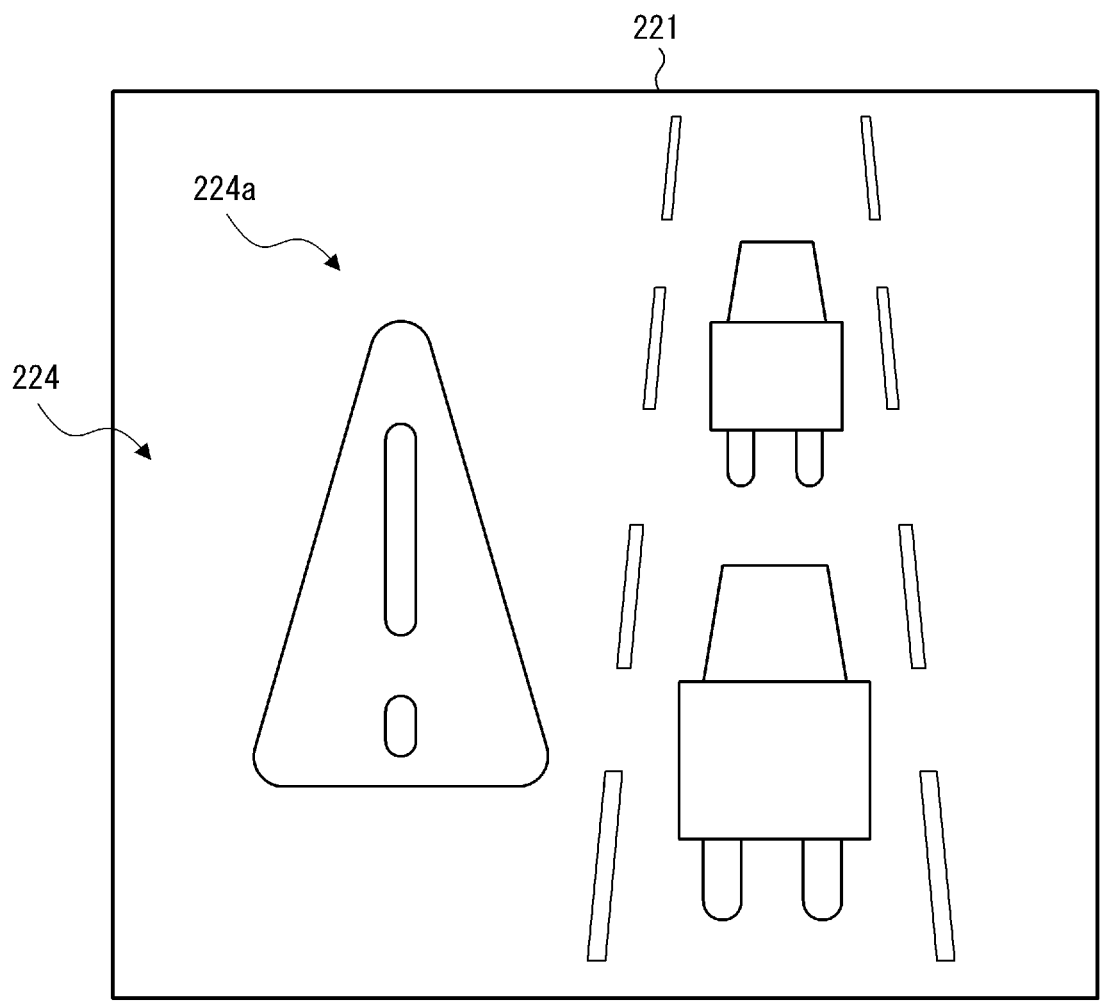
FIG. 12 illustrates a scan image represented by scan image data generated for the display image of the second example in the example illustrated in FIG. 11.

FIG. 12 illustrates a scan image 221 represented by scan image data generated for the display image 220 of the second example in the example illustrated in FIG. 11. Since the relative luminance of the content present region 224 is 200%, the scan image acquiring unit 126 increases the length of the content present region 224 in the vertical scan direction to twice the length in the display image 220. In this case, since the content absent region 222 and the content absent region 226 are located at the upper side and the lower side, respectively, of the display image 220 in the vertical scan direction, the scan image acquiring unit 126 extends the content present region 224 upward and downward. Thus, the scan image acquiring unit 126 acquires scan image data representing the scan image 221 illustrated in FIG. 12.

Figure 13:
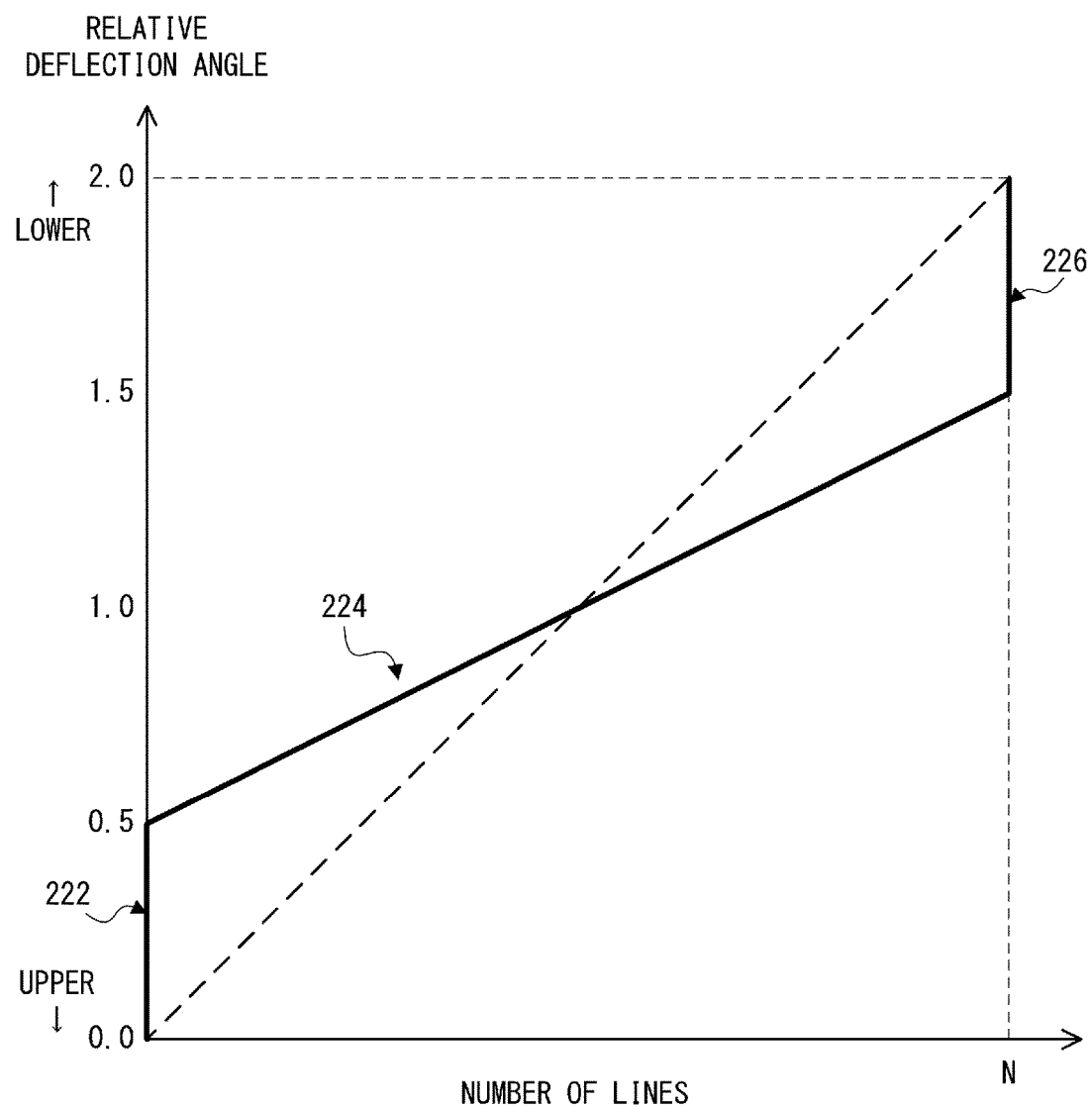
FIG. 13 illustrates a scan waveform for the display image of the second example in the example illustrated in FIG. 11.

FIG. 13 illustrates a scan waveform for the display image 220 of the second example in the example illustrated in FIG. 11. The horizontal axis and the vertical axis of the scan waveform illustrated in FIG. 13 represent the same as those in the scan waveform illustrated in FIG. 7. Since the relative luminance of the content present region 224 is 200%, the scan waveform acquiring unit 142 sets the speed to one-half the constant speed in the segment corresponding to the content present region 224 with the relative deflection angles ranging from 0.5 to 1.5. Meanwhile, since the relative luminance of the content absent region 222 is 0%, the scan waveform acquiring unit 142 sets the speed to a substantially infinite speed in the segment corresponding to the content absent region 222 with the relative deflection angles ranging from 0.0 to 0.5. In a similar manner, since the relative luminance of the content absent region 226 is 0%, the scan waveform acquiring unit 142 sets the speed to a substantially infinite speed in the segment corresponding to the content absent region 226 with the relative deflection angles ranging from 1.5 to 2.0. Thus, the relative deflection angle becomes 2.0 when the number of lines is N, as in the case in which the vertical scan speed is constant. In other words, the frame scan time is constant even when the vertical scan speed is lowered in the content present region.

Figure 14:
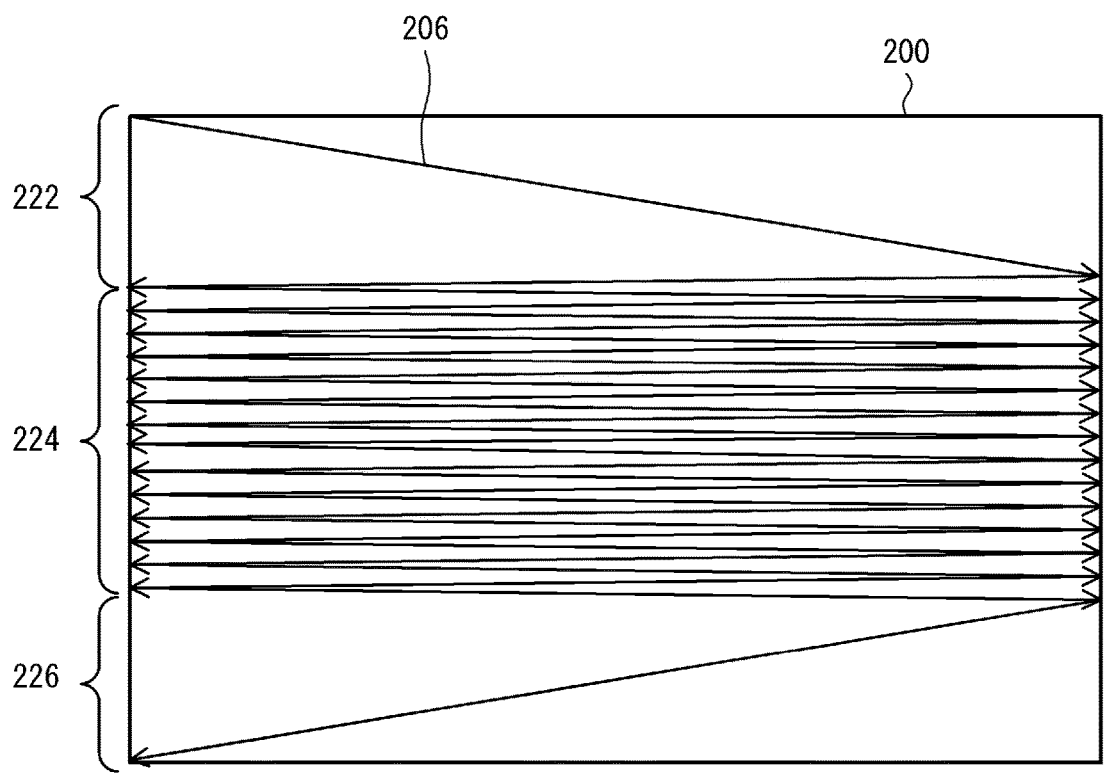
FIG. 14 illustrates laser scan loci obtained when the display image of the second example is projected onto the screen with the use of the scan image data according to the example illustrated in FIG. 11.

FIG. 14 illustrates laser scan loci 206 obtained when the display image 220 of the second example is projected onto the screen 200 with the use of the scan image data according to the example illustrated in FIG. 11. The laser scan loci 206 illustrated in FIG. 14 correspond to loci obtained when the scan image 221 illustrated in FIG. 12 is projected with the use of the scan waveform illustrated in FIG. 13. Specifically, the vertical scan speed is being lowered in the content present region 224, and the vertical scan speed is being raised in the content absent region 222 and the content absent region 226. In addition, the density of the lines is higher in the content present region 224. Meanwhile, the density of the lines is lower in the content absent region 222 and the content absent region 226. Thus, the display image 220 illustrated in FIG. 10 is displayed on the screen 200.

Since the density of the lines is higher in the content present region 224, the relative luminance of the content present region 224 is higher. In this case, as in the first exemplary embodiment, the frame scan time and the frame size can be made constant as the vertical scan speed in the content absent region 222 and the content absent region 226 is being raised. Therefore, according to the second exemplary embodiment, when the urgency level is high, the luminance of the content present region can be raised while the frame scan time and the frame size are kept constant. Therefore, when the urgency level is high, the user can visually recognize a warning display or the like more reliably.

Third Exemplary Embodiment

Next, a third exemplary embodiment will be described. The third exemplary embodiment differs from the other exemplary embodiments in that the vertical scan speed is determined in accordance with the brightness of the surroundings. In other words, in the third exemplary embodiment, the speed changing condition concerns with the brightness of the surroundings. The hardware configuration of an image display apparatus 100 according to the third exemplary embodiment is substantially the same as that of the first exemplary embodiment, and thus descriptions thereof will be omitted.

Figure 15:
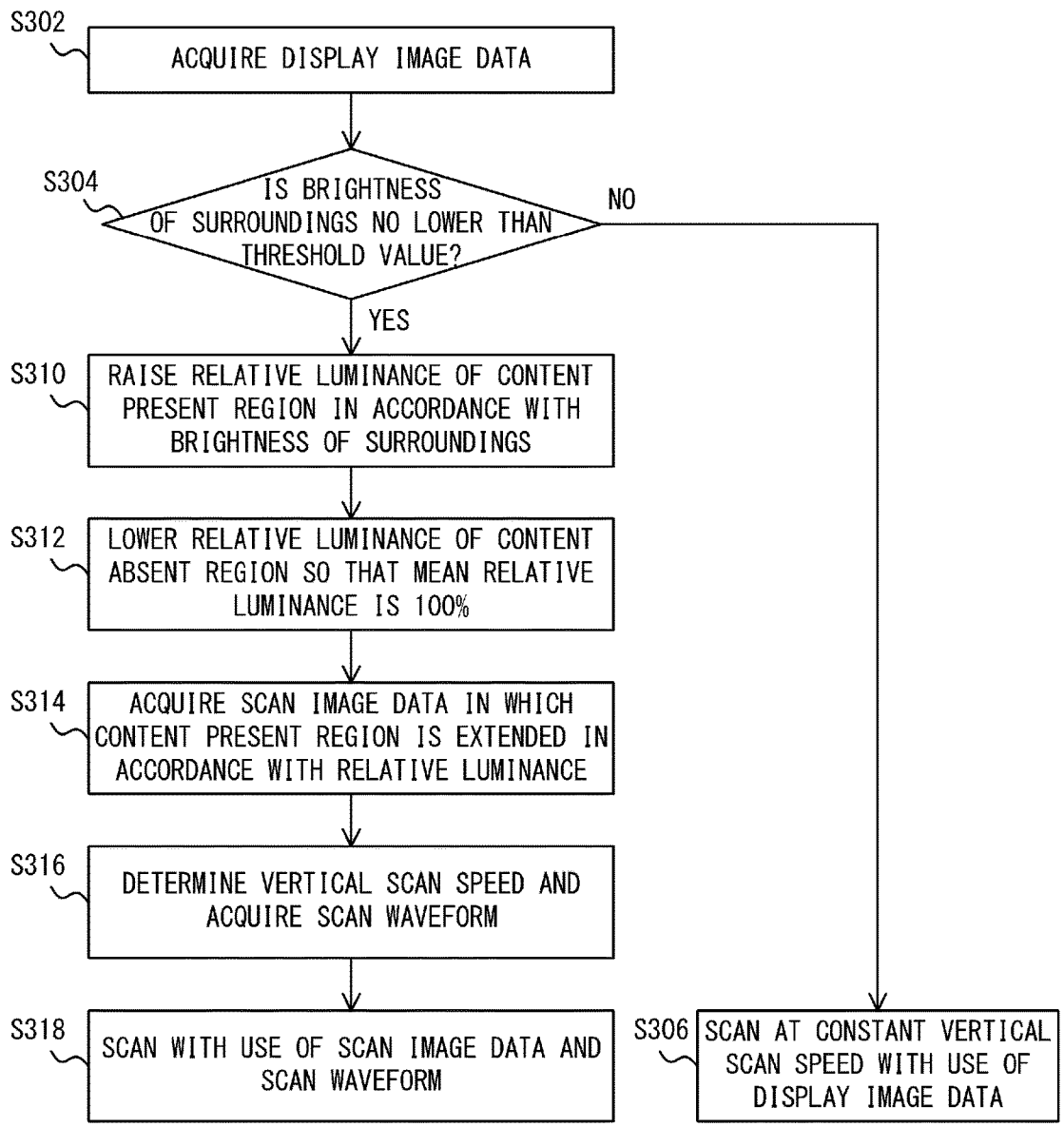
FIG. 15 is a flowchart illustrating an image display method implemented by the image display apparatus according to a third exemplary embodiment.

FIG. 15 is a flowchart illustrating an image display method implemented by the image display apparatus 100 according to the third exemplary embodiment. First, the image processing unit 120 acquires display image data (step S302). Next, in a similar manner to the processing in S104 illustrated in FIG. 3, the condition determining unit 122 determines whether the brightness of the surroundings is no lower than a threshold value (step S304). If it is determined that the brightness of the surroundings is lower than the threshold value (NO in S304), in a similar manner to S106 illustrated in FIG. 3, the control unit 110 carries out control to scan the laser light at a constant vertical scan speed, namely, in a normal operation and causes the display image to be displayed on the screen 200 (step S306).

On the other hand, if it is determined that the brightness of the surroundings is no lower than the threshold value (YES in S304), the luminance determining unit 124 raises the relative luminance of the content present region in accordance with the brightness of the surroundings (step S310). The luminance determining unit 124 also lowers the relative luminance of the content absent region so that the mean relative luminance is 100% (step S312). The processing in S310 to S318 is substantially the same as the processing in S110 to S118, respectively, illustrated in FIG. 3, and thus only the differences from the first exemplary embodiment will be described.

In S310 and S312, for example, the luminance determining unit 124 slightly raises the relative luminance of the content present region when the brightness of the surroundings is no lower than a first threshold value serving as a determination standard in S304 but is lower than a second threshold value that is higher than the first threshold value. In this case, the luminance determining unit 124 slightly lowers the relative luminance of the content absent region so that the mean relative luminance is 100%. In this case, the relative luminance of the content absent region is higher than 0%. Then, the luminance determining unit 124 further raises the relative luminance of the content present region when the brightness of the surroundings is no lower than the second threshold value. In this case, the luminance determining unit 124 further lowers the relative luminance of the content absent region so that the mean relative luminance is 100%.

Figure 16:
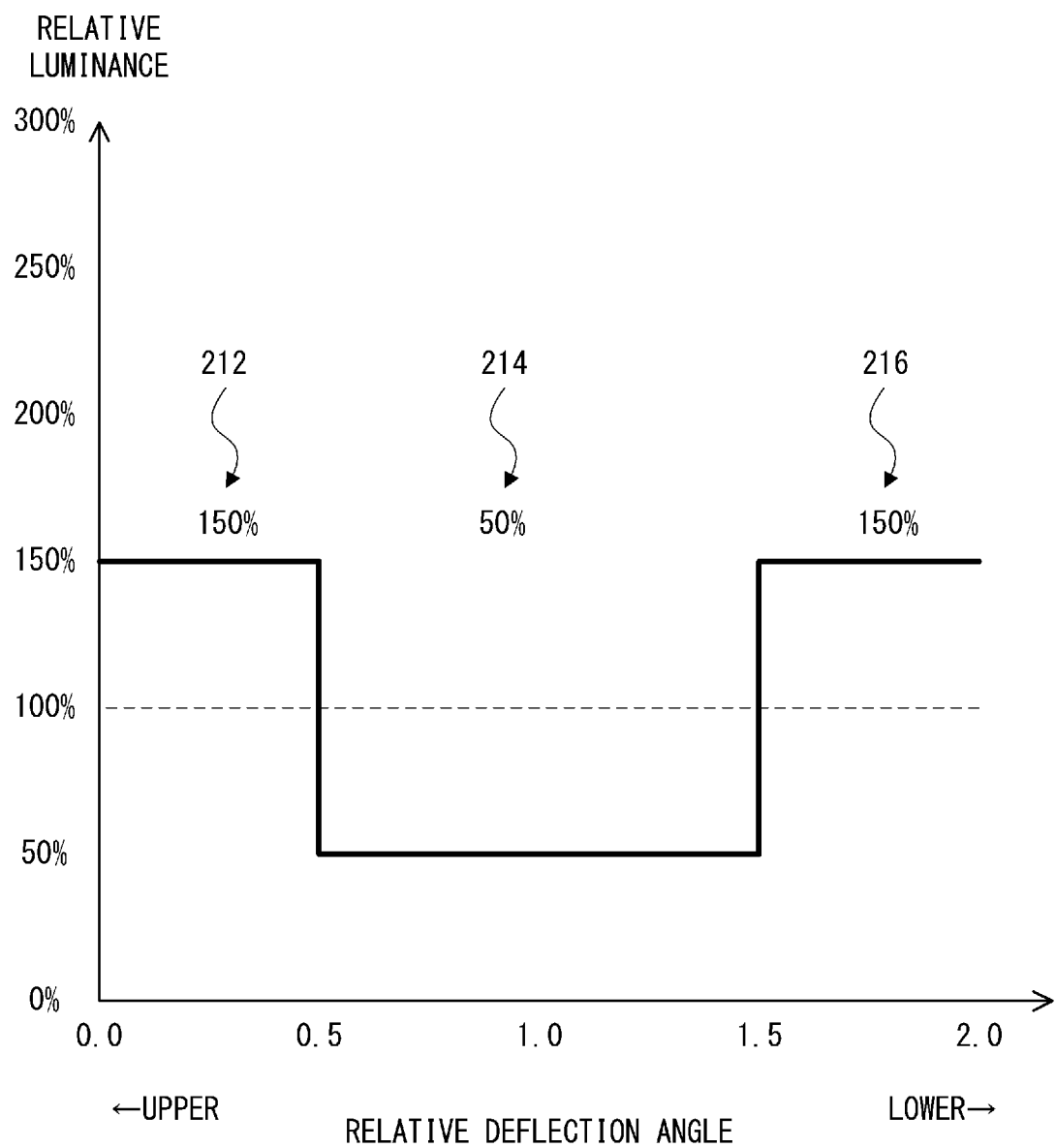
FIG. 16 illustrates the relative luminance of each region in the display image of the first example, in the third exemplary embodiment.

FIG. 16 illustrates the relative luminance of each region in the display image 210 of the first example, in the third exemplary embodiment. FIG. 16 illustrates an example in which the brightness of the surroundings is no lower than the first threshold value but is lower than the second threshold value. In the example illustrated in FIG. 16, the luminance determining unit 124 sets the relative luminance of the content present region 212 to 150% and the relative luminance of the content present region 216 to 150%. The luminance determining unit 124 sets the relative luminance of the content absent region 214 so that the mean relative luminance is 100%. In this example, the relative luminance of the content absent region 214 is 50%. Thus, the frame scan time can be made constant.

Since the relative luminance of the content present region 212 is 150%, the scan image acquiring unit 126 carries out image processing to increase the length of the content present region 212 in the vertical scan direction to 1.5 times the length in the display image 210. In a similar manner, since the relative luminance of the content present region 216 is 150%, the scan image acquiring unit 126 carries out image processing to increase the length of the content present region 216 in the vertical scan direction to 1.5 times the length in the display image 210.

Figure 17:
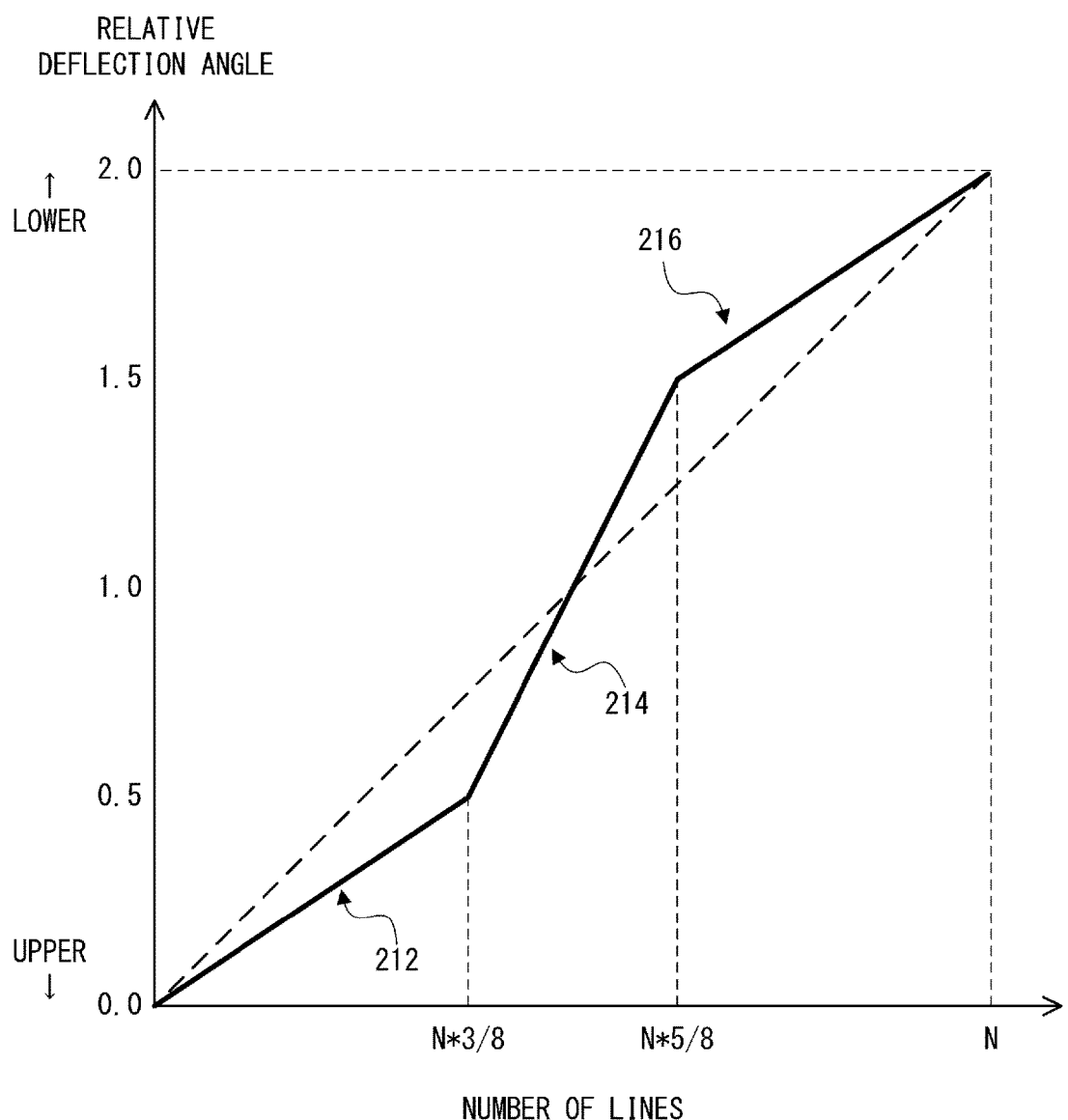
FIG. 17 illustrates a scan waveform for the display image of the first example in the example illustrated in FIG. 16.

FIG. 17 illustrates a scan waveform for the display image 210 of the first example in the example illustrated in FIG. 16. Since the relative luminance of the content present region 212 is 150%, the scan waveform acquiring unit 142 sets the speed to 1/1.5 times the constant speed in the segment corresponding to the content present region 212 with the relative deflection angles ranging from 0 to 0.5. In a similar manner, since the relative luminance of the content present region 216 is 150%, the scan waveform acquiring unit 142 sets the speed to 1/1.5 times the constant speed in the segment corresponding to the content present region 216 with the relative deflection angles ranging from 1.5 to 2.0. Meanwhile, since the relative luminance of the content absent region 214 is 50%, the scan waveform acquiring unit 142 sets the speed to 1/0.5 times the constant speed in the segment corresponding to the content absent region 214 with the relative deflection angles ranging from 0.5 to 1.5. Thus, the relative deflection angle becomes 2.0 when the number of lines is N, as in the case in which the vertical scan speed is constant. In other words, the frame scan time is constant even when the vertical scan speed is lowered in the content present regions.

When the brightness of the surroundings is no lower than the second threshold value, as illustrated in FIG. 5, the luminance determining unit 124 sets the relative luminance of the content present region 212 and the content present region 216 to 200% and sets the relative luminance of the content absent region 214 to 0%. Thus, the luminance of the content present region can be raised in accordance with the brightness of the surroundings. Thus, even when the surroundings are bright, the user can visually recognize the content present in the content present region more reliably.

In addition, as such a configuration that raises the luminance of the content present region as the surroundings are brighter is employed, the user can visually recognize the content in a similar manner regardless of the brightness of the surroundings. In other words, if the luminance of the content present region is being raised to the maximum when the brightness of the surroundings is higher than the first threshold value but is lower than the second threshold value, the luminance of the content present region cannot be raised any further when the surroundings become even brighter. In that case, the user can visually recognize the content less easily as compared to the case in which the brightness of the surroundings is lower than the second threshold value. In other words, a variation in the ease of visual recognition arises depending on the difference in the brightness of the surroundings. As the configuration that raises the luminance of the content present region as the surroundings are brighter is employed as in the third exemplary embodiment, a variation in the ease of visual recognition depending on the difference in the brightness of the surroundings can be suppressed.

Fourth Exemplary Embodiment

Next, a fourth exemplary embodiment will be described. The fourth exemplary embodiment differs from the other exemplary embodiments in that the vertical scan speed is determined on the basis of the urgency level. In other words, in the fourth exemplary embodiment, the speed changing condition concerns with the urgency level. The hardware configuration of an image display apparatus 100 according to the fourth exemplary embodiment is substantially the same as that of the first exemplary embodiment, and thus descriptions thereof will be omitted.

Figure 18:
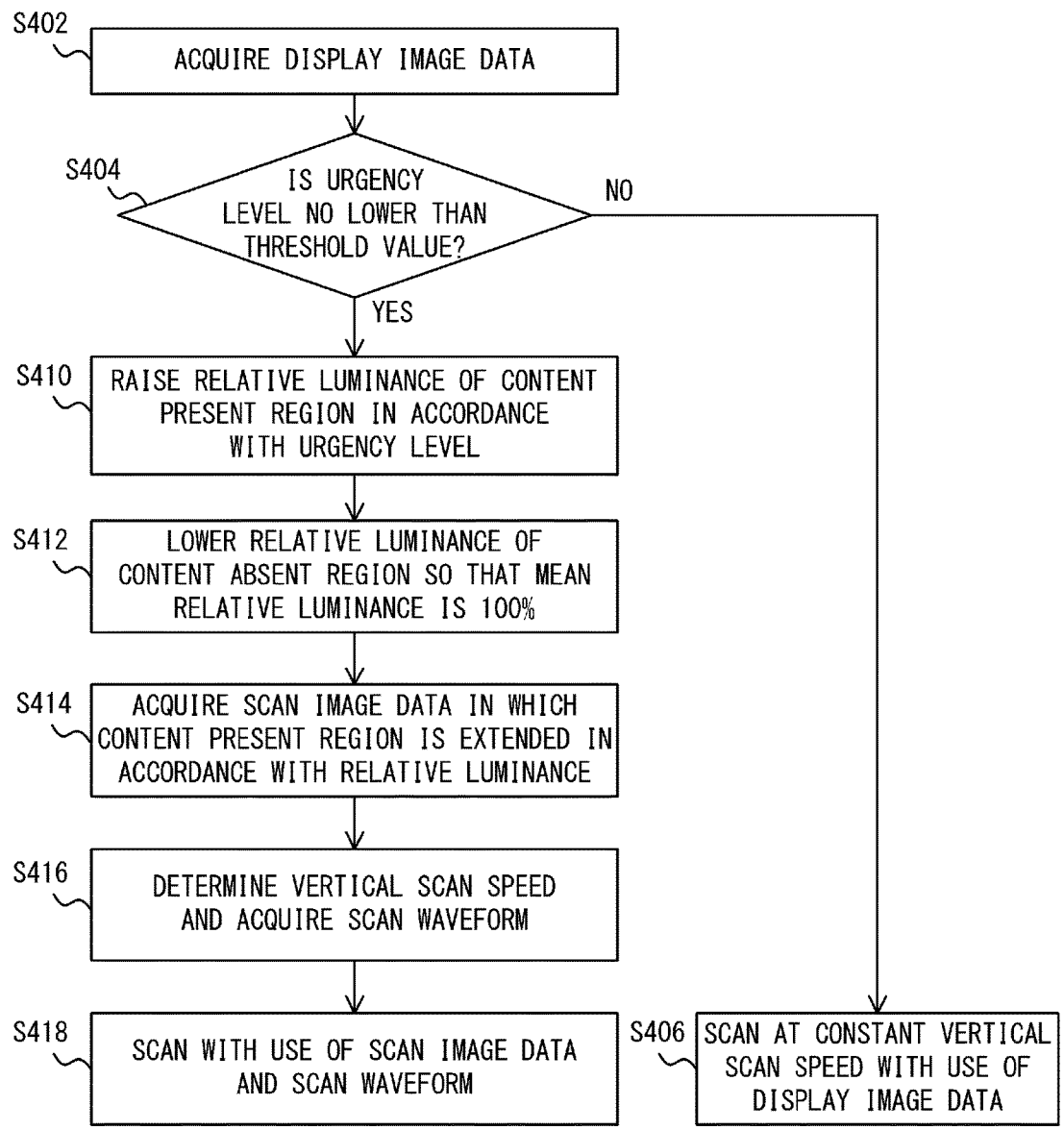
FIG. 18 is a flowchart illustrating an image display method implemented by the image display apparatus according to a fourth exemplary embodiment.

FIG. 18 is a flowchart illustrating an image display method implemented by the image display apparatus 100 according to the fourth exemplary embodiment. First, the image processing unit 120 acquires display image data (step S402). Next, in a similar manner to the processing in S204 illustrated in FIG. 9, the condition determining unit 122 determines whether the urgency level is no lower than a threshold value (step S404). If it is determined that the urgency level is lower than the threshold value (NO in S404), in a similar manner to S106 illustrated in FIG. 3, the control unit 110 carries out control to scan the laser light at a constant vertical scan speed, namely, in a normal operation and causes the display image to be displayed on the screen 200 (step S406).

On the other hand, if it is determined that the urgency level is no lower than the threshold value (YES in S404), the luminance determining unit 124 raises the relative luminance of the content present region in accordance with the urgency level (step S410). The luminance determining unit 124 also lowers the relative luminance of the content absent region so that the mean relative luminance is 100% (step S412). The processing in S410 to S418 is substantially the same as the processing in S110 to S118, respectively, illustrated in FIG. 3, and thus only the differences from the first exemplary embodiment will be described.

In S410 and S412, for example, the luminance determining unit 124 slightly raises the relative luminance of the content present region when the urgency level is no lower than a third threshold value serving as a determination standard in S404 but is lower than a fourth threshold value that is higher than the third threshold value. In this case, the luminance determining unit 124 slightly lowers the relative luminance of the content absent region so that the mean relative luminance is 100%. In this case, the relative luminance of the content absent region is higher than 0%. Then, the luminance determining unit 124 further raises the relative luminance of the content present region when the urgency level is no lower than the fourth threshold value. In this case, the luminance determining unit 124 further lowers the relative luminance of the content absent region so that the mean relative luminance is 100%.

Figure 19:
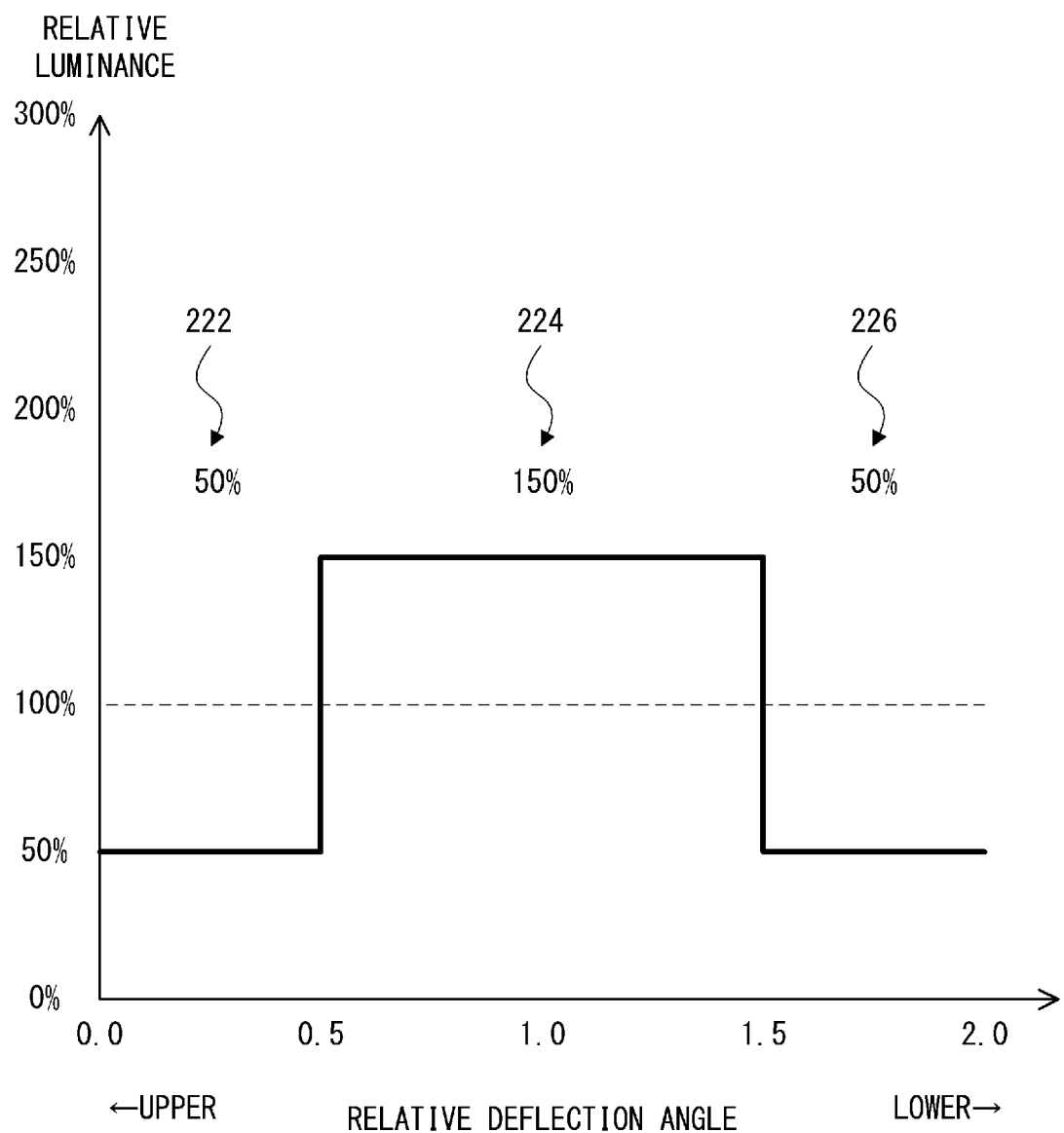
FIG. 19 illustrates the relative luminance of each region in the display image of the second example, in the fourth exemplary embodiment.

FIG. 19 illustrates the relative luminance of each region in the display image 220 of the second example, in the fourth exemplary embodiment. FIG. 19 illustrates an example in which the urgency level is no lower than the third threshold value but is lower than the fourth threshold value. In the example illustrated in FIG. 19, the luminance determining unit 124 sets the relative luminance of the content present region 224 to 150%. In addition, the luminance determining unit 124 sets the luminance of the content absent region 222 and the content absent region 226 so that the mean relative luminance is 100%. In this example, the relative luminance of the content absent region 222 and the content absent region 226 is 50%. Thus, the frame scan time can be made constant. Since the relative luminance of the content present region 224 is 150%, the scan image acquiring unit 126 carries out image processing to increase the length of the content present region 224 in the vertical scan direction to 1.5 times the length in the display image 220.

Figure 20:
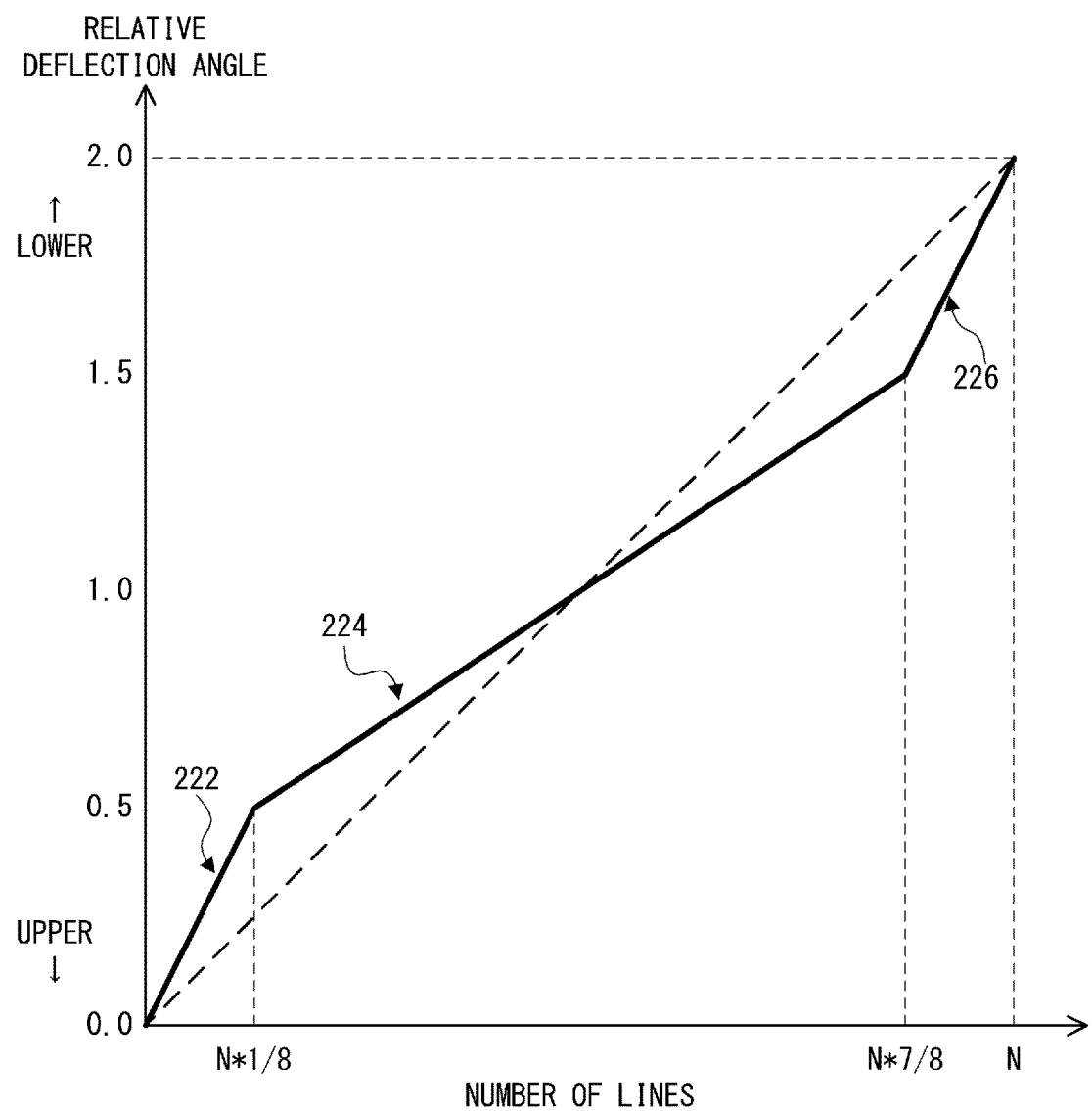
FIG. 20 illustrates a scan waveform for the display image of the second example in the example illustrated in FIG. 19.

FIG. 20 illustrates a scan waveform for the display image 220 of the second example in the example illustrated in FIG. 19. Since the relative luminance of the content present region 224 is 150%, the scan waveform acquiring unit 142 sets the speed to 1/1.5 times the constant speed in the segment corresponding to the content present region 224 with the relative deflection angles ranging from 0.5 to 1.5. Meanwhile, since the relative luminance of the content absent region 222 is 50%, the scan waveform acquiring unit 142 sets the speed to 1/0.5 times the constant speed in the segment corresponding to the content absent region 222 with the relative deflection angles ranging from 0.0 to 0.5. In a similar manner, since the relative luminance of the content absent region 226 is 50%, the scan waveform acquiring unit 142 sets the speed to 1/0.5 times the constant speed in the segment corresponding to the content absent region 226 with the relative deflection angles ranging from 1.5 to 2.0. Thus, the relative deflection angle becomes 2.0 when the number of lines is N, as in the case in which the vertical scan speed is constant. In other words, the frame scan time is constant even when the vertical scan speed is lowered in the content present region.

When the urgency level is no lower than the fourth threshold value, as illustrated in FIG. 11, the luminance determining unit 124 sets the relative luminance of the content present region 224 to 200% and sets the relative luminance of the content absent region 222 and the content absent region 226 to 0%. In this manner, the luminance of the content present region can be raised in accordance with the urgency level. Therefore, the visibility of the content improves as the urgency level is higher, and thus the user can visually recognize that the urgency level is high more reliably. In other words, the user can be informed more reliably that the urgency level is high.

Fifth Exemplary Embodiment

Next, a fifth exemplary embodiment will be described. The fifth exemplary embodiment differs from the other exemplary embodiments in that the vertical scan speed is lowered in a content present region in which a content concerning with a high urgency level is present. In other words, in the fifth exemplary embodiment, the speed changing condition concerns with the urgency level. The hardware configuration of an image display apparatus 100 according to the fifth exemplary embodiment is substantially the same as that of the first exemplary embodiment, and thus descriptions thereof will be omitted.

Figure 21:
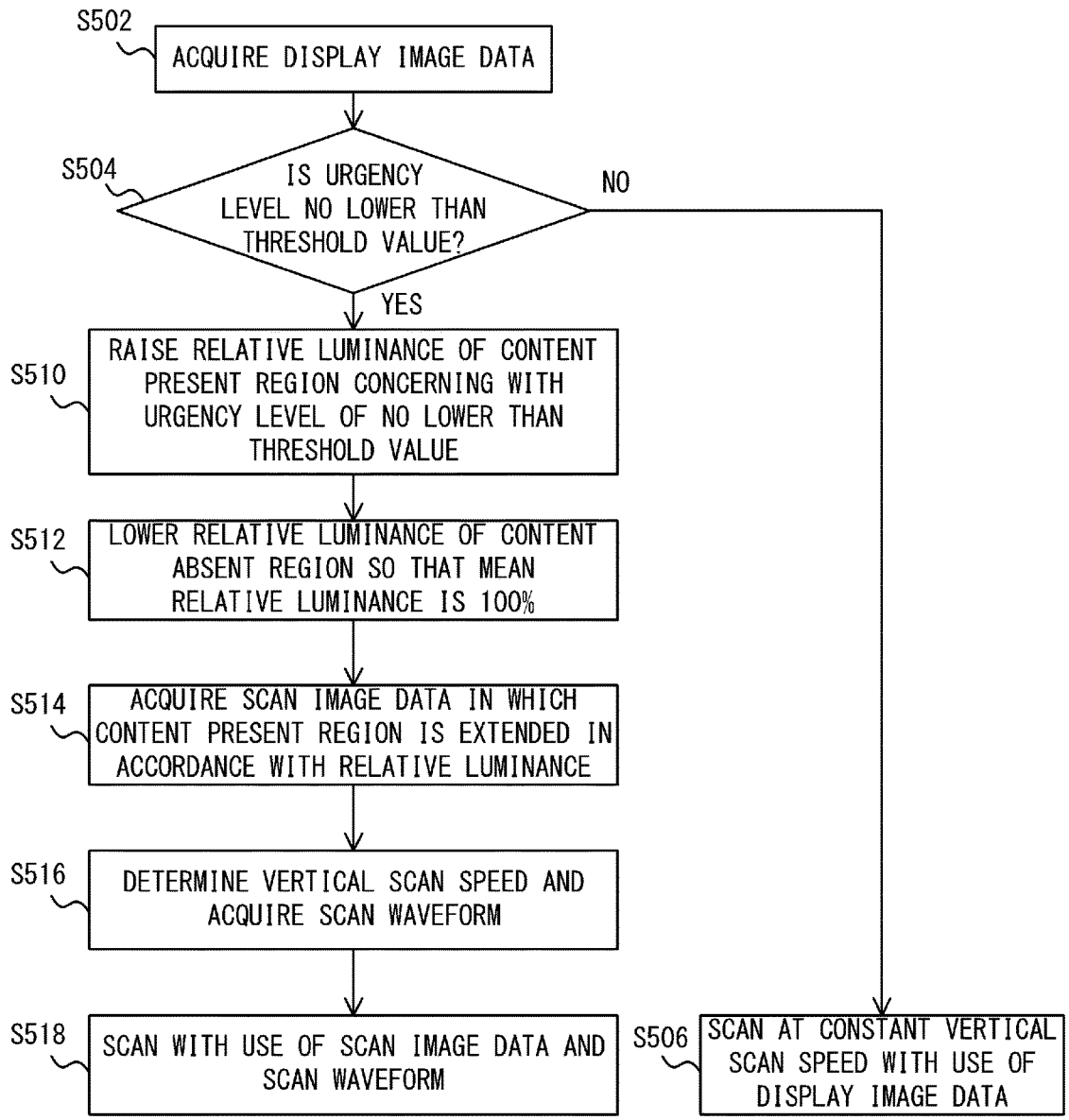
FIG. 21 is a flowchart illustrating an image display method implemented by the image display apparatus according to a fifth exemplary embodiment.

FIG. 21 is a flowchart illustrating an image display method implemented by the image display apparatus 100 according to the fifth exemplary embodiment. First, the image processing unit 120 acquires display image data (step S502). Next, in a similar manner to the processing in S204 illustrated in FIG. 9, the condition determining unit 122 determines whether the urgency level is no lower than a threshold value (step S504). If it is determined that the urgency level is lower than the threshold value (NO in S504), in a similar manner to S106 illustrated in FIG. 3, the control unit 110 carries out control to scan the laser light at a constant vertical scan speed, namely, in a normal operation and causes the display image to be displayed on the screen 200 (step S506).

On the other hand, if it is determined that the urgency level is no lower than the threshold value (YES in S504), the luminance determining unit 124 raises the relative luminance of the content present region in which the content concerning with the urgency level of no lower than the threshold value is present (step S510). The luminance determining unit 124 may raise the relative luminance of the content present region in which the content concerning with the urgency level of no lower than the threshold value is not present to such a level that falls below the relative luminance of the content present region in which the content concerning with the urgency level of no lower than the threshold value is present. Alternatively, the luminance determining unit 124 may retain the relative luminance of the content present region in which the content concerning with the urgency level of no lower than the threshold value is not present at 100% without raising the stated relative luminance. The luminance determining unit 124 lowers the relative luminance of the content absent region so that the mean relative luminance is 100% (step S512). The processing in S510 to S518 is substantially the same as the processing in S110 to S118, respectively, illustrated in FIG. 3, and thus only the differences from the first exemplary embodiment will be described.

Figure 22:
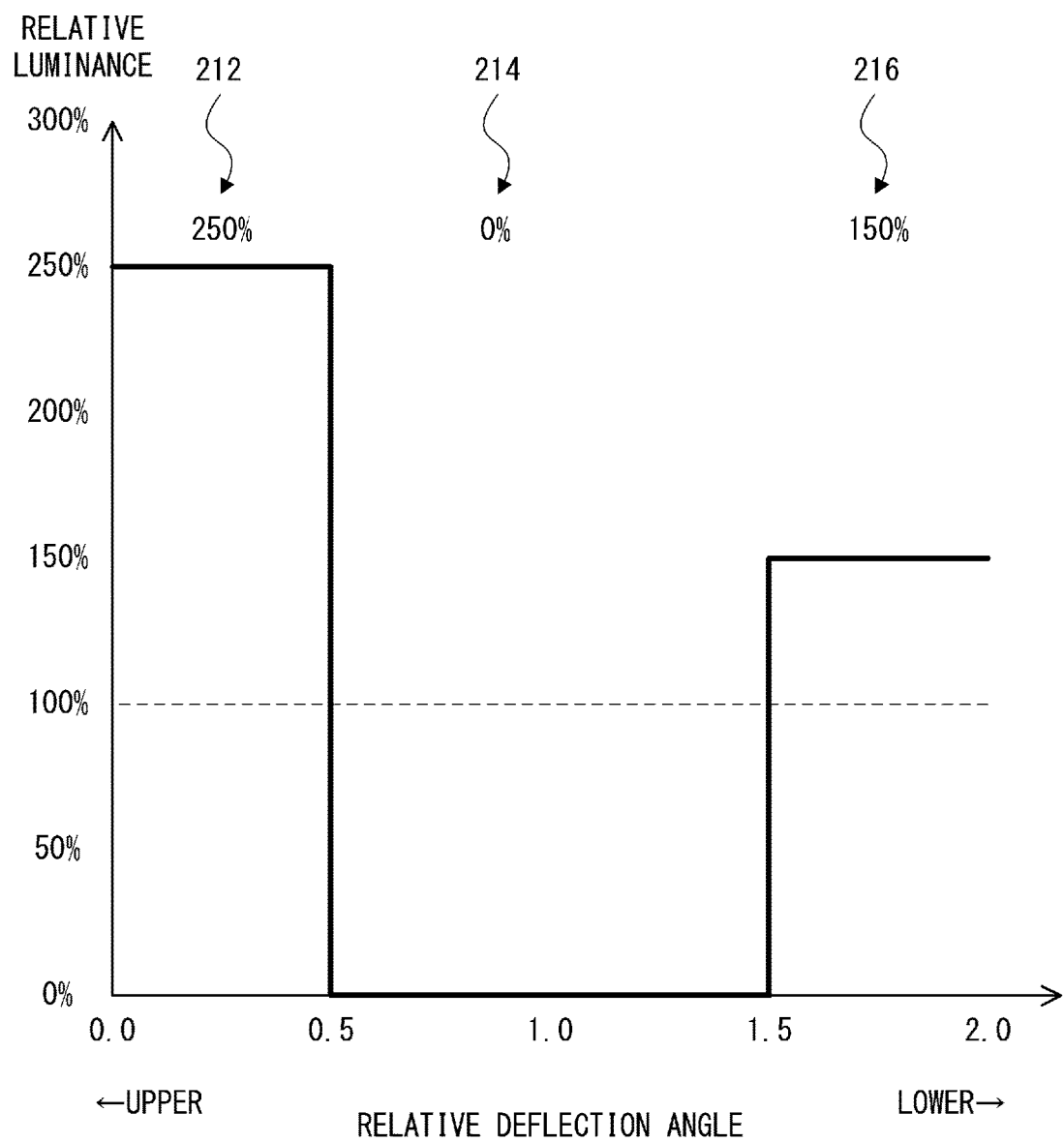
FIG. 22 illustrates the relative luminance of each region in the display image of the first example, in the fifth exemplary embodiment.

FIG. 22 illustrates the relative luminance of each region in the display image 210 of the first example, in the fifth exemplary embodiment. FIG. 22 illustrates an example in which the relative luminance of the content present region 212 is being raised. For example, when the distance to the right curve is short, the urgency level concerning with the content 212a is regarded as being no lower than the threshold value. Therefore, the luminance determining unit 124 raises the relative luminance of the content present region 212, that includes the content 212a corresponding to the urgency level concerning with the distance to the right curve being short, to 250%. In FIG. 22, the luminance determining unit 124 also raises the relative luminance of the content present region 216 to 150%, which is lower than 250%. The luminance determining unit 124 determines the relative luminance of the content absent region 214 so that the mean relative luminance is 100%. In this example, the relative luminance of the content absent region 214 is 0%. Thus, the frame scan time can be made constant.

Since the relative luminance of the content present region 212 is 250%, the scan image acquiring unit 126 carries out image processing to increase the length of the content present region 212 in the vertical scan direction to 2.5 times the length in the display image 210. In a similar manner, since the relative luminance of the content present region 216 is 150%, the scan image acquiring unit 126 carries out image processing to increase the length of the content present region 216 in the vertical scan direction to 1.5 times the length in the display image 210.

Figure 23:
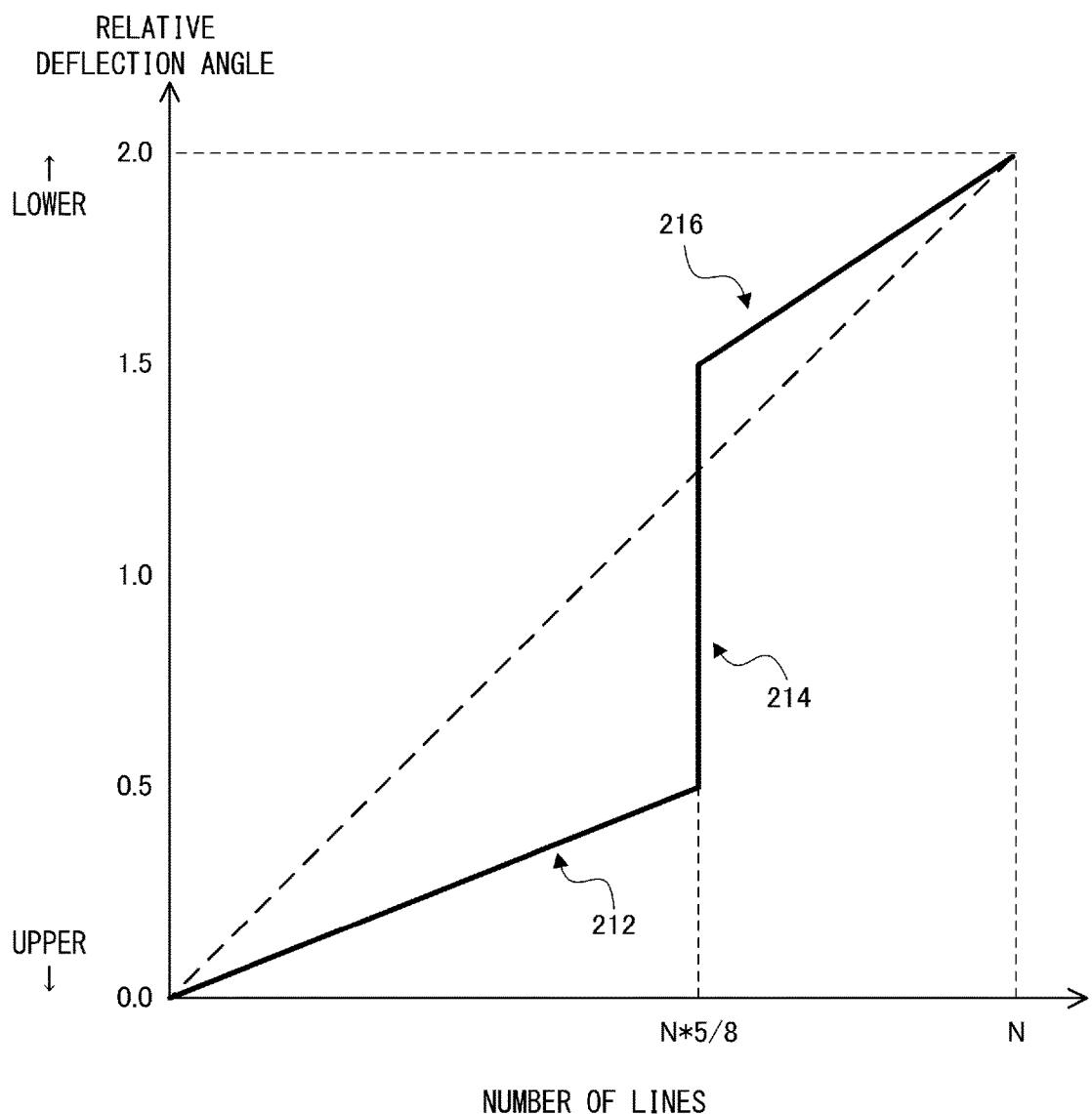
FIG. 23 illustrates a scan waveform for the display image of the first example in the example illustrated in FIG. 22.

FIG. 23 illustrates a scan waveform for the display image 210 of the first example in the example illustrated in FIG. 22. Since the relative luminance of the content present region 212 is 250%, the scan waveform acquiring unit 142 sets the speed to 1/2.5 times the constant speed in the segment corresponding to the content present region 212 with the relative deflection angles ranging from 0 to 0.5. In addition, since the relative luminance of the content present region 216 is 150%, the scan waveform acquiring unit 142 sets the speed to 1/1.5 times the constant speed in the segment corresponding to the content present region 216 with the relative deflection angles ranging from 1.5 to 2.0. Meanwhile, since the relative luminance of the content absent region 214 is 0%, the scan waveform acquiring unit 142 sets the speed to a substantially infinite speed in the segment corresponding to the content absent region 214 with the relative deflection angles ranging from 0.5 to 1.5. Thus, the relative deflection angle becomes 2.0 when the number of lines is N, as in the case in which the vertical scan speed is constant. In other words, the frame scan time is constant even when the vertical scan speed is lowered in the content present regions.

Figure 24:
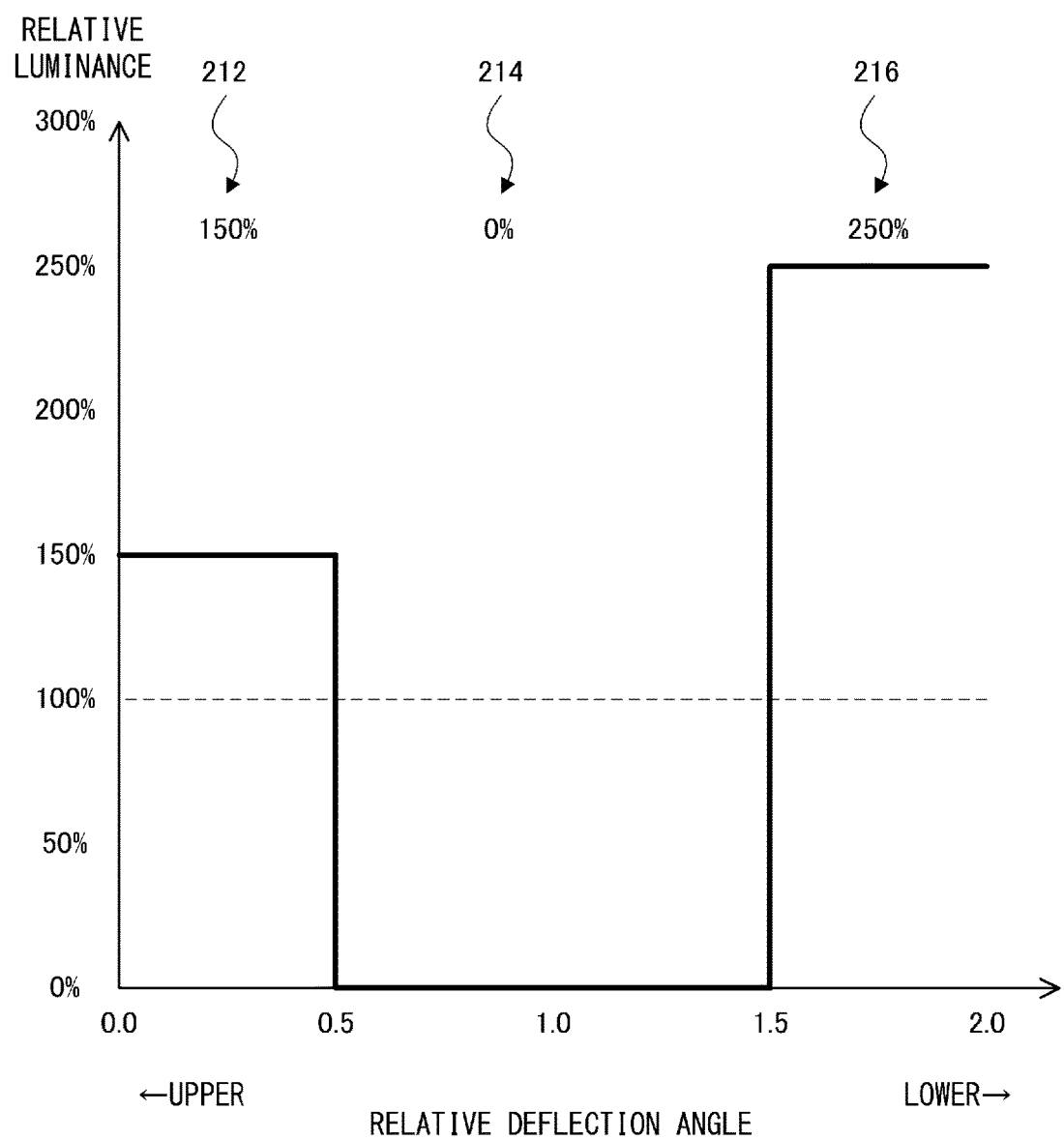
FIG. 24 illustrates the relative luminance of each region in the display image of the first example, in the fifth exemplary embodiment.

FIG. 24 illustrates the relative luminance of each region in the display image 210 of the first example, in the fifth exemplary embodiment. FIG. 24 illustrates an example in which the relative luminance of the content present region 216 is being raised. For example, when the speed exceeds the speed limit, the urgency level concerning with the content 216a and the content 216b is regarded as being no lower than the threshold value. Therefore, the luminance determining unit 124 raises the relative luminance of the content present region 216, that includes the content 216a and the content 216b corresponding to the urgency level concerning with the speed exceeding the speed limit, to 250%. In FIG. 24, the luminance determining unit 124 also raises the luminance of the content present region 212 to 150%, which is lower than 250%. The luminance determining unit 124 determines the relative luminance of the content absent region 214 so that the mean relative luminance is 100%. In this example, the relative luminance of the content absent region 214 is 0%. Thus, the frame scan time can be made constant.

Since the relative luminance of the content present region 212 is 150%, the scan image acquiring unit 126 carries out image processing to increase the length of the content present region 212 in the vertical scan direction to 1.5 times the length in the display image 210. In a similar manner, since the relative luminance of the content present region 216 is 250%, the scan image acquiring unit 126 carries out image processing to increase the length of the content present region 216 in the vertical scan direction to 2.5 times the length in the display image 210.

Figure 25:
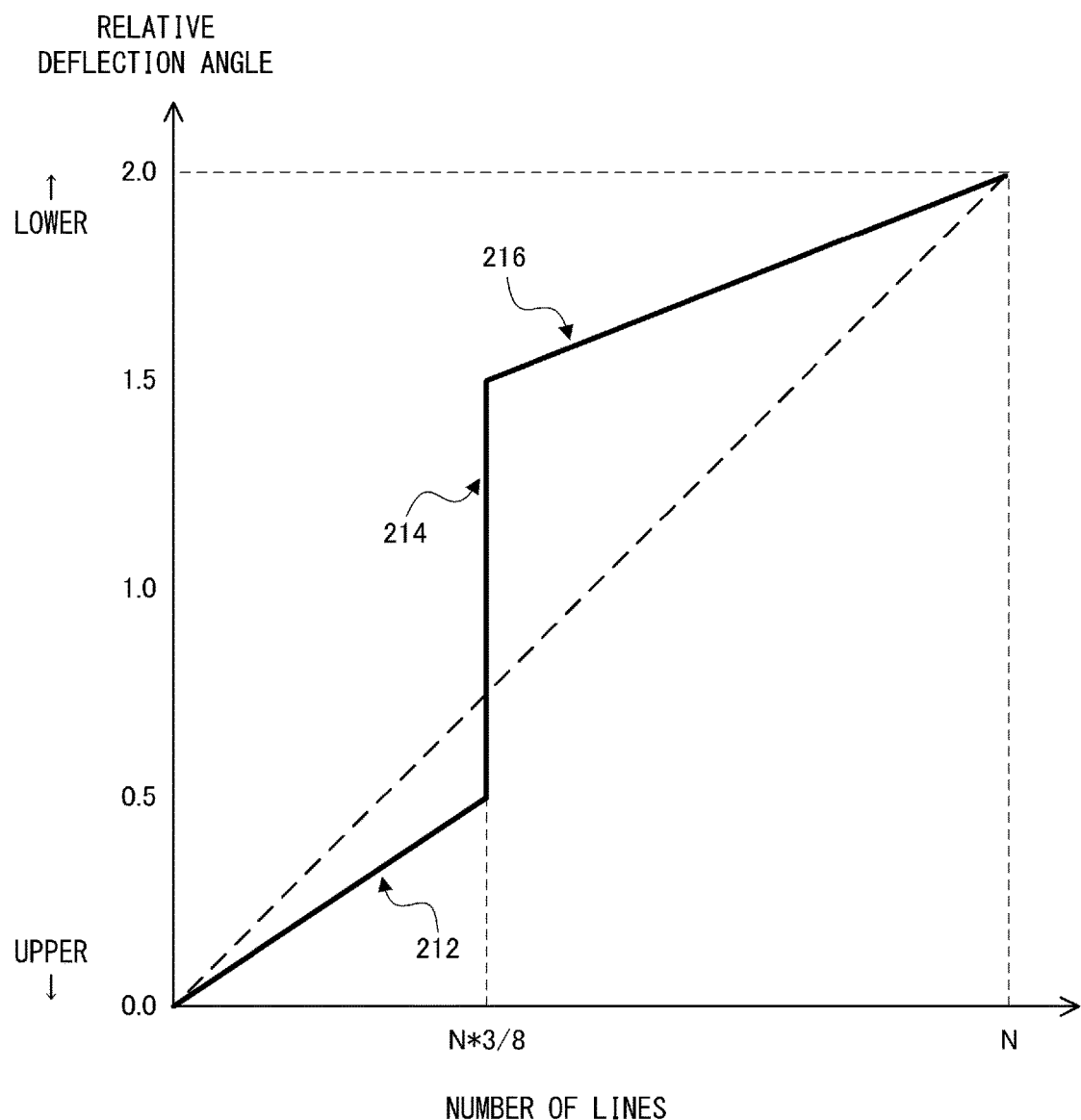
FIG. 25 illustrates a scan waveform for the display image of the first example in the example illustrated in FIG. 24.

FIG. 25 illustrates a scan waveform for the display image 210 of the first example in the example illustrated in FIG. 24. Since the relative luminance of the content present region 212 is 150%, the scan waveform acquiring unit 142 sets the speed to 1/1.5 times the constant speed in the segment corresponding to the content present region 212 with the relative deflection angles ranging from 0 to 0.5. In addition, since the relative luminance of the content present region 216 is 250%, the scan waveform acquiring unit 142 sets the speed to 1/2.5 times the constant speed in the segment corresponding to the content present region 216 with the relative deflection angles ranging from 1.5 to 2.0. Meanwhile, since the relative luminance of the content absent region 214 is 0%, the scan waveform acquiring unit 142 sets the speed to a substantially infinite speed in the segment corresponding to the content absent region 214 with the relative deflection angles ranging from 0.5 to 1.5. Thus, the relative deflection angle becomes 2.0 when the number of lines is N, as in the case in which the vertical scan speed is constant. In other words, the frame scan time is constant even when the vertical scan speed is lowered in the content present regions.

In the fifth exemplary embodiment, with the configuration described above, as the urgency level is higher, the visibility of the content concerning with that urgency level improves. Therefore, the user can visually recognize that the urgency level is high more reliably. In other words, the image display apparatus 100 according to the fifth exemplary embodiment can inform the user more reliably that the urgency level is high.

Modifications

It is to be noted that the present invention is not limited to the exemplary embodiments described above, and modifications can be made as appropriate within the scope that does not depart from the technical spirit. For example, the first exemplary embodiment to the fifth exemplary embodiment described above can be applied to one another. In other words, two or more of the first exemplary embodiment to the fifth exemplary embodiment can be combined.

For example, the second exemplary embodiment may be applied to the first exemplary embodiment. In this case, when the brightness of the surroundings is no lower than the threshold value and the urgency level is no lower than the threshold value, the luminance of a content present region may be raised, that is, the vertical scan speed in a content present region may be lowered. Alternatively, the luminance of a content present region may be raised when the brightness of the surroundings is no lower than the threshold value, and then the luminance of the content present region may be further raised when the urgency level has reached or exceeded the threshold value. Conversely, the luminance of a content present region may be raised when the urgency level is no lower than the threshold value, and then the luminance of the content present region may be further raised when the brightness of the surroundings has reached or exceeded the threshold value.

The scan waveform acquiring unit 142 generates, or acquires, a scan waveform illustrated in FIG. 7 and so on in the foregoing exemplary embodiments, but this configuration is not a limiting example. No scan waveform needs to be generated if the scan control unit 140 can control the scanner driver 172 so that the vertical scan speed in a content present region is lowered in accordance with the luminance and the vertical scan speed in a content absent region is raised in accordance with the luminance. However, generating a scan waveform makes the control of the scan control unit 140 simpler.

The vertical scan speed is constant within one content present region in the foregoing exemplary embodiments, but this configuration is not a limiting example. The vertical scan speed within one content present region need not be constant. In this case, for example, the luminance determining unit 124 may set the luminance of the upper side in the content present region 212 higher than the luminance of the lower side therein in the display image 210 illustrated in FIG. 4. In this case, the vertical scan speed in the upper side is lower than that in the lower side, in the content present region 212. Such a configuration allows the content 212a to be displayed in gradations in which the upper side is brighter.

The foregoing exemplary embodiments have been described with an example of a display image in which contents are arranged vertically as illustrated in FIG. 4, but the present exemplary embodiments can also be applied to a display image in which contents are arranged horizontally. In this case, the image display apparatus 100 as a whole or at least the scanner unit 170 may be rotated by 90 degrees along a plane parallel to the screen 200, and the display image may also be rotated by 90 degrees along with the aforementioned rotation. In this case, the vertical scan direction coincides with the lateral direction on the screen 200.

The plurality of content present regions have the same luminance in the first exemplary embodiment and the third exemplary embodiment, but this configuration is not a limiting example. A storage device such as the flash memory 152 may store a table associating contents or content present regions with relative luminances in advance. Then, the luminance determining unit 124 may determine the luminance of each content present region with reference to this table.

The foregoing exemplary embodiments have been described with examples in which the speed changing condition concerns with the brightness of the surroundings or the urgency level being no lower than a threshold value, but this configuration is not a limiting example. For example, the luminance of a content present region may be raised upon the user pressing a switch. In this case, the condition determining unit 122 determines whether the switch has been pressed.

The foregoing exemplary embodiments illustrate examples in which the number of steps by which the luminance of a content present region is raised is two, but the number of steps by which the luminance of a content present region is raised is set arbitrarily. In other words, the number of steps by which the luminance of a content present region is raised may be three. In this case, three threshold values may be set. Furthermore, the luminance determining unit 124 may calculate the luminance of a content present region through an equation proportional to the brightness or the urgency level. In this case, the luminance of a content present region is raised continuously as the brightness or the urgency level increases.

The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

According to the present exemplary embodiments, an image display apparatus, an image display method, and a program that can raise the luminance of a portion corresponding to a content while keeping the frame scan time and the frame size constant can be provided.

INDUSTRIAL APPLICABILITY

The present invention can be used, for example, in an image display apparatus that displays an image.

What is claimed is:
1. An image display apparatus, comprising:
a laser light source unit configured to output laser light;
a scan mirror unit configured to reflect and scan the laser light;
at least one processor configured by to execute instructions to:
control the laser light source unit so that a display image corresponding to input display image data is displayed;
control the scan mirror unit so that the display image corresponding to the display image data is displayed,
wherein, in a case in which a predetermined condition is satisfied, set a vertical scan speed, held when a first region in which a content is present in the display image data is scanned in a vertical direction, to a first speed that is lower than a constant speed that is set when a frame scan time required to display one frame is a constant time with the vertical scan speed held constant, and set a vertical scan speed held when a second region in which no content is present in the display image data is scanned in a vertical direction to a second speed that is higher than the constant speed so that the frame scan time is the constant time; and
acquire scan image data in which a length of the first region in the vertical scan direction is increased in accordance with the first speed, in a case in which the predetermined condition is satisfied,
wherein the laser light source unit is controlled so that the display image corresponding to the display image data is displayed with the use of the scan image data.

2. The image display apparatus according to claim 1, wherein the at least one processor is configured to:
determine a luminance of the first region for the input display image data, and
determine the length by which the first region is increased on the basis of the determined luminance.

3. The image display apparatus according to claim 1, wherein the predetermined condition is a condition in which the content displayed in the first region is displayed with an increased display luminance.

4. The image display apparatus according to claim 3, wherein the condition in which the content is displayed with the increased display luminance is that an urgency level of the content displayed in the first region is no lower than a predetermined threshold value.

5. The image display apparatus according to claim 4, wherein the at least one processor is configured to lower the first speed and raise the second speed as the urgency level of the content displayed in the first region becomes higher.

6. The image display apparatus according to claim 3, wherein the condition in which the content is displayed with the increased display luminance is that a brightness of surroundings is no lower than a predetermined threshold value.

7. The image display apparatus according to claim 6, wherein the at least one processor is configured to lower the first speed and raise the second speed as the brightness becomes higher.

8. An image display method, comprising:
acquiring display image data;
in a case in which a predetermined condition is satisfied, performing control so that a display image corresponding to the display image data is displayed with a vertical scan speed, held when a first region in which a content is present in the display image data is scanned in a vertical direction, being set to a first speed that is lower than a constant speed that is set when a frame scan time required to display one frame is a constant time with the vertical scan speed held constant and with a vertical scan speed, held when a second region in which no content is present in the display image data is scanned in a vertical direction, being set to a second speed that is higher than the constant speed so that the frame scan time is the constant time; and
acquire scan image data in which a length of the first region in the vertical scan direction is increased in accordance with the first speed, in a case in which the predetermined condition is satisfied, wherein the control is performed so that the display image corresponding to the display image data is displayed with the use of the scan image data.

9. A non-transitory computer readable medium storing a program causing a computer to execute a method comprising:
acquiring display image data; and performing control, in a case in which a predetermined condition is satisfied, so that a display image corresponding to the display image data is displayed with a vertical scan speed held when a first region in which a content is present in the display image data is scanned in a vertical direction, being set to a first speed that is lower than a constant speed that is set when a frame scan time required to display one frame is a constant time with the vertical scan speed held constant and with a vertical scan speed, held when a second region in which no content is present in the display image data is scanned in a vertical direction, being set to a second speed that is higher than the constant speed so that the frame scan time is the constant time; and acquiring scan image data in which a length of the first region in the vertical scan direction is increased in accordance with the first speed, in a case in which the predetermined condition is satisfied, wherein the control is performed so that the display image corresponding to the display image data is displayed with the use of the scan image data.

* * * * *